United States Patent
Hiraoka et al.

(10) Patent No.: US 9,483,371 B2
(45) Date of Patent: Nov. 1, 2016

(54) STORAGE SYSTEM, CONTROL APPARATUS, COMPUTER PRODUCT, AND CONTROL METHOD

(71) Applicant: FUJITSU LIMITED, Kawasaki-shi, Kanagawa (JP)

(72) Inventors: Yutaro Hiraoka, Kawasaki (JP); Tatsushi Takamura, Sagamihara (JP); Kazunori Kobashi, Yamato (JP); Yasuhito Kikuchi, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 145 days.

(21) Appl. No.: 14/229,391

(22) Filed: Mar. 28, 2014

(65) Prior Publication Data
US 2014/0325263 A1    Oct. 30, 2014

(30) Foreign Application Priority Data
Apr. 30, 2013 (JP) ................................ 2013-095795

(51) Int. Cl.
*G06F 11/00* (2006.01)
*G06F 11/20* (2006.01)
*G06F 11/07* (2006.01)

(52) U.S. Cl.
CPC ......... *G06F 11/2094* (2013.01); *G06F 11/076* (2013.01); *G06F 11/0727* (2013.01)

(58) Field of Classification Search
USPC ........................................................ 714/47
See application file for complete search history.

(56) References Cited

U.S. PATENT DOCUMENTS

| | | | |
|---|---|---|---|
| 7,627,786 B2 | 12/2009 | Bello et al. | |
| 2005/0120259 A1* | 6/2005 | Aoki | G06F 11/2051 714/4.11 |
| 2005/0198553 A1 | 9/2005 | Okamoto et al. | |
| 2007/0220313 A1 | 9/2007 | Katsuragi et al. | |
| 2008/0144450 A1 | 6/2008 | Chen | |
| 2013/0080829 A1* | 3/2013 | Colline | G06F 11/0727 714/6.22 |

FOREIGN PATENT DOCUMENTS

| | | |
|---|---|---|
| JP | 05-143377 A | 6/1993 |
| JP | 06-103122 A | 4/1994 |
| JP | 2005-251042 A | 9/2005 |

OTHER PUBLICATIONS

Extended European Search Report dated Apr. 24, 2015 for corresponding of European Patent Application 14161740.7, 9 pages.

* cited by examiner

*Primary Examiner* — Sarai Butler
(74) *Attorney, Agent, or Firm* — Fujitsu Patent Center

(57) ABSTRACT

A storage system includes a first control apparatus; at least one second control apparatus managed by the first control apparatus; and a storage unit accessed by the second control apparatus. The second control apparatus determines based on detection of an error of an input/output process for storage in the storage unit whether the storage is in a blocking state, executes a resumption process of the input/output process when the storage is in the blocking state, judges whether an error occurrence frequency of the input/output process is at least a predetermined value, when the storage is not in the blocking state, and transmits to the first control apparatus, a blocking process request for the storage, when the error occurrence frequency is at least the predetermined value. The first control apparatus executes a blocking process and an error process of the storage, based on reception of the blocking process request.

10 Claims, 18 Drawing Sheets

FIG.4

BLOCKING FLAG TABLE — 400

| LUN | BLOCKING FLAG |
|---|---|
| LUN#1 | OFF |
| LUN#2 | ON |
| : | : |

FIG.5

BLOCKING LIST — 500

| LUN#2 | LUN#5 | ... |
|---|---|---|

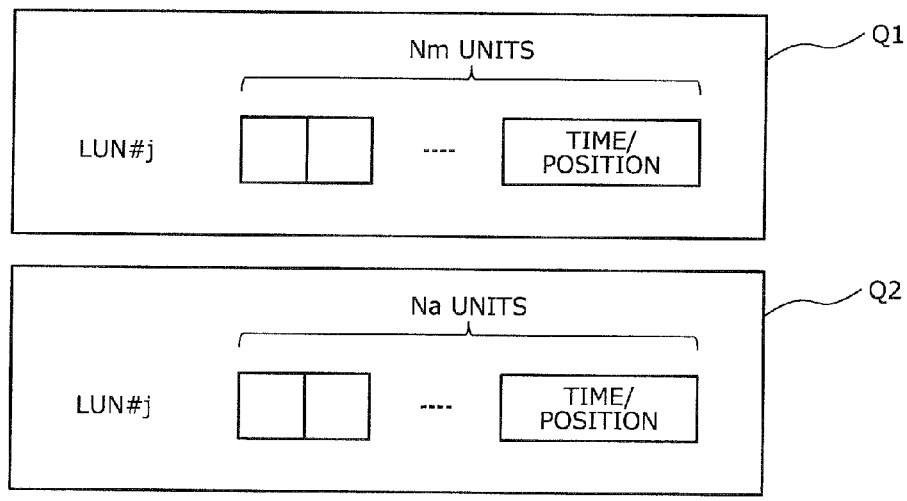
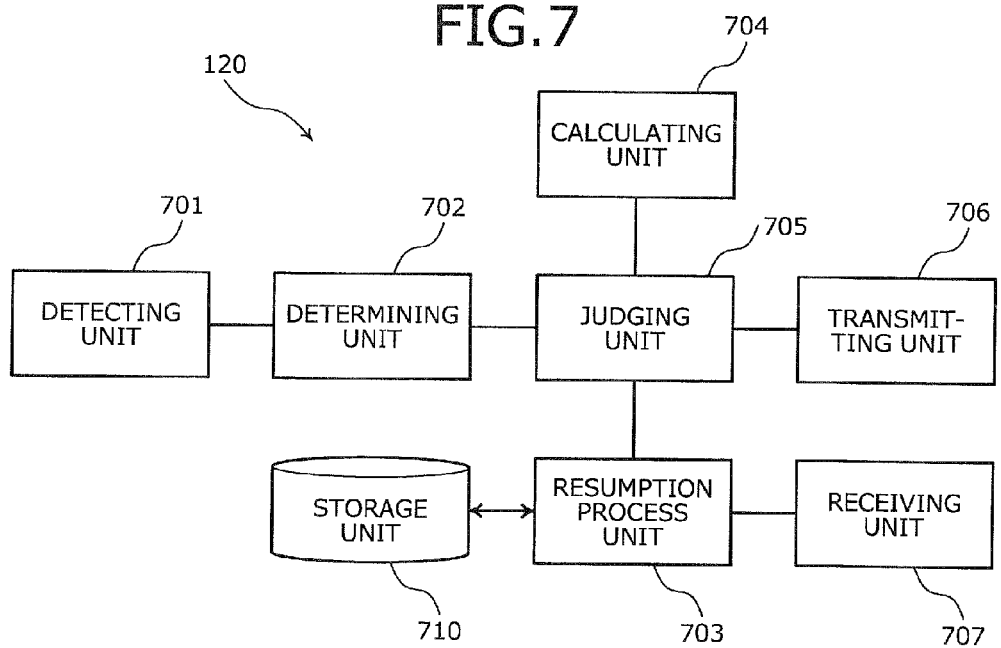

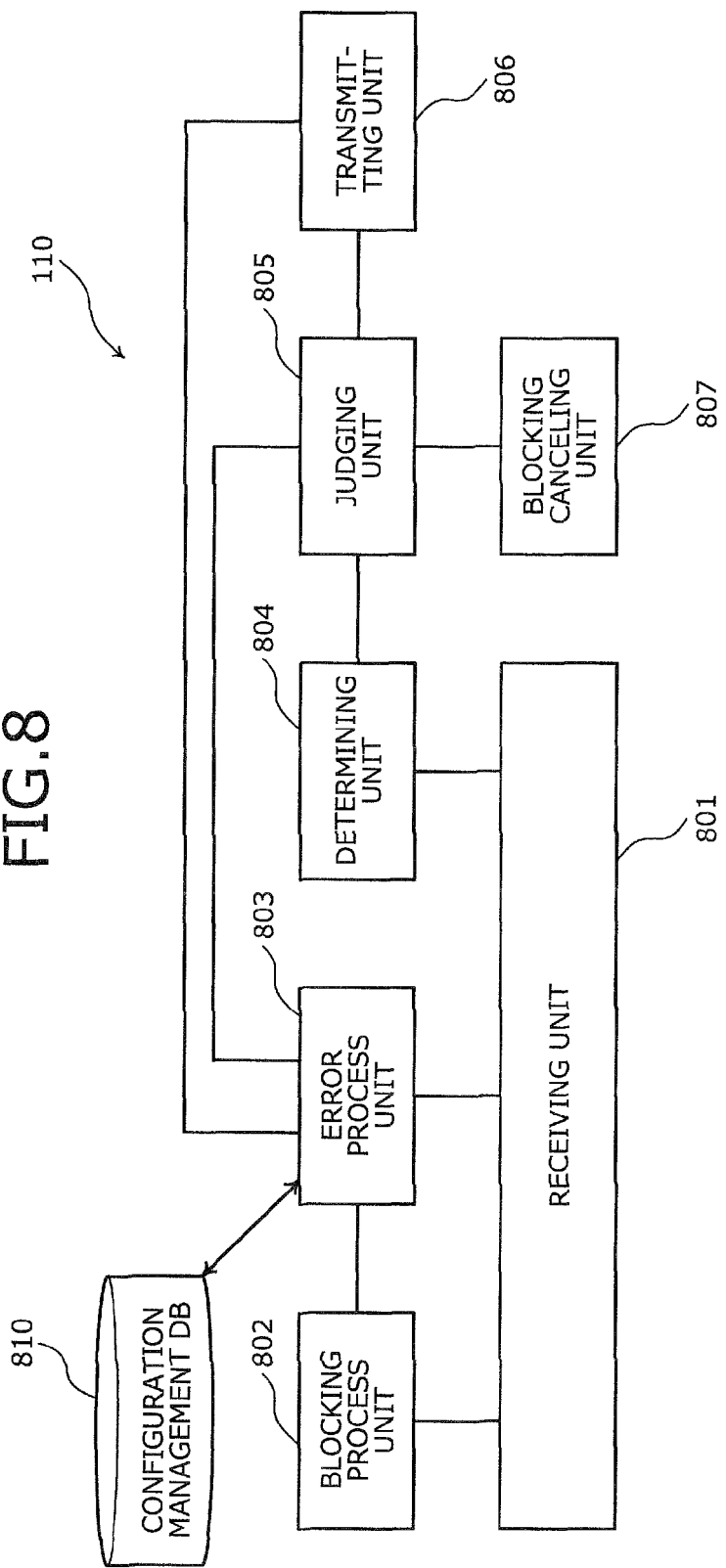

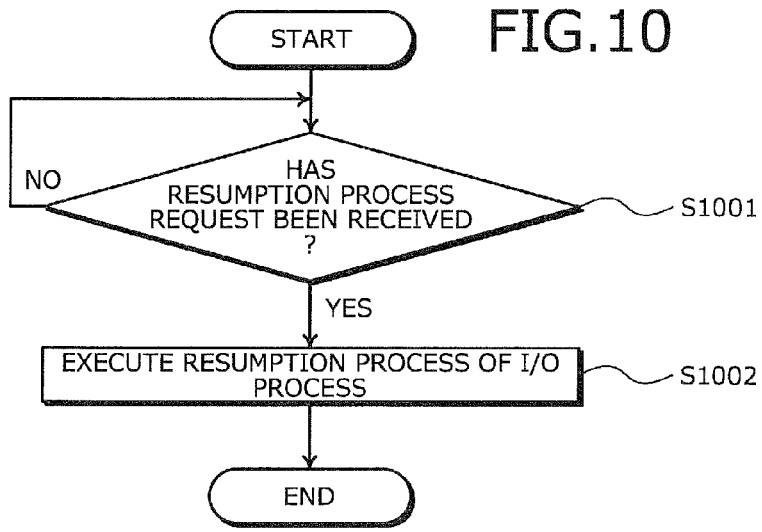
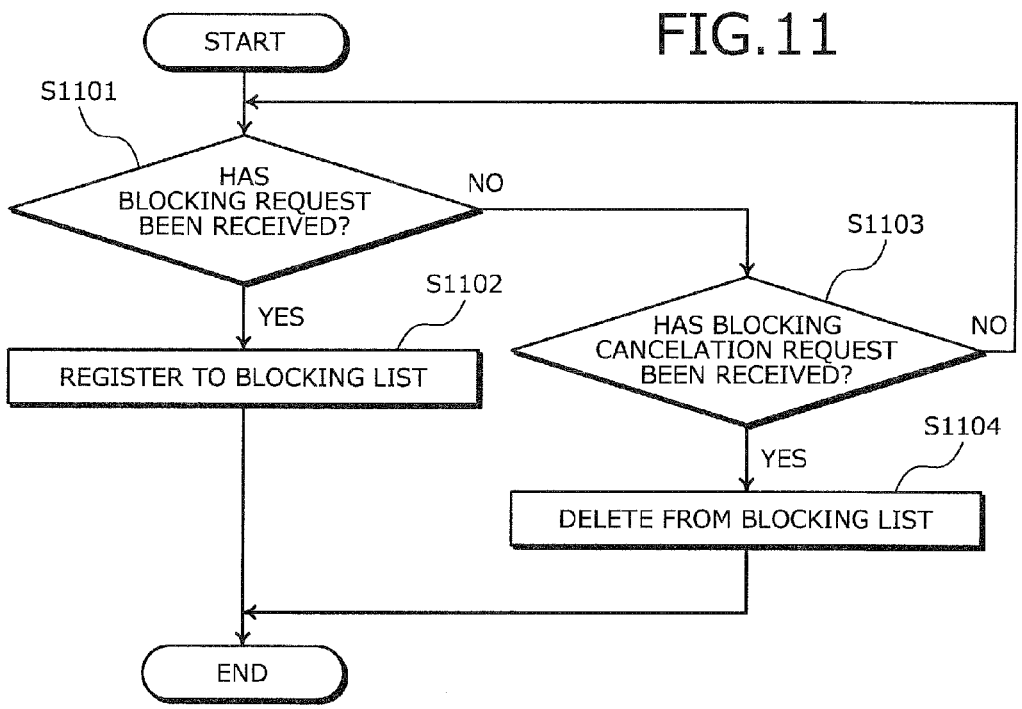

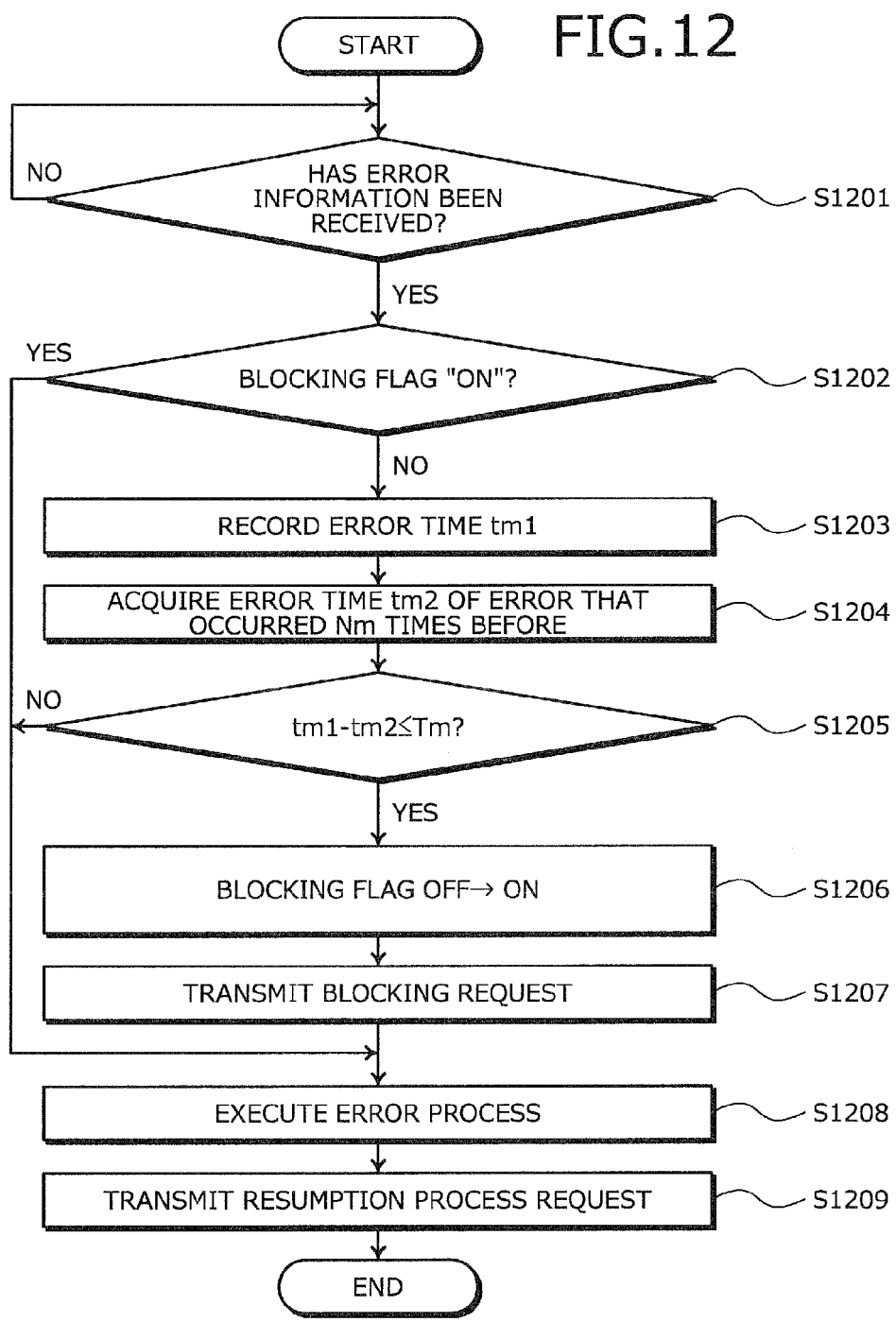

FIG.15

SEGMENT TABLE — 1500

| VOLUME NUMBER | SEGMENT SET NUMBER | SEGMENT NUMBER | SU NUMBER | LUN NUMBER | SEGMENT STATE |
|---|---|---|---|---|---|
| 1 | 1 | 1 | 1 | 1 | VALID |
| 1 | 1 | 2 | 1 | 2 | VALID |
| : | : | : | : | : | : |
| 1 | 1 | 7 | 1 | 7 | VALID |
| 1 | 1 | 8 | 1 | 8 | VALID |
| 1 | 2 | 1 | 2 | 1 | VALID |
| 1 | 2 | 2 | 2 | 2 | VALID |
| : | : | : | : | : | : |

| NUMBER OF ERROR-GENERATING AGENTS \ NUMBER OF ERROR-GENERATING VDISKS | n (>0) | N (>n) |
|---|---|---|
| m (>0) | AGENT: n/m ⋯ (α)<br>MANAGER: n ⋯ (β) | AGENT: N/m ⋯ (γ) (>α)<br>MANAGER: N ⋯ (>β) |
| M (>m) | AGENT: n/M ⋯ (<α) (δ)<br>MANAGER: n ⋯ (=β) | AGENT: N/M ⋯ (<γ) (>δ)<br>MANAGER: N ⋯ (>β) |

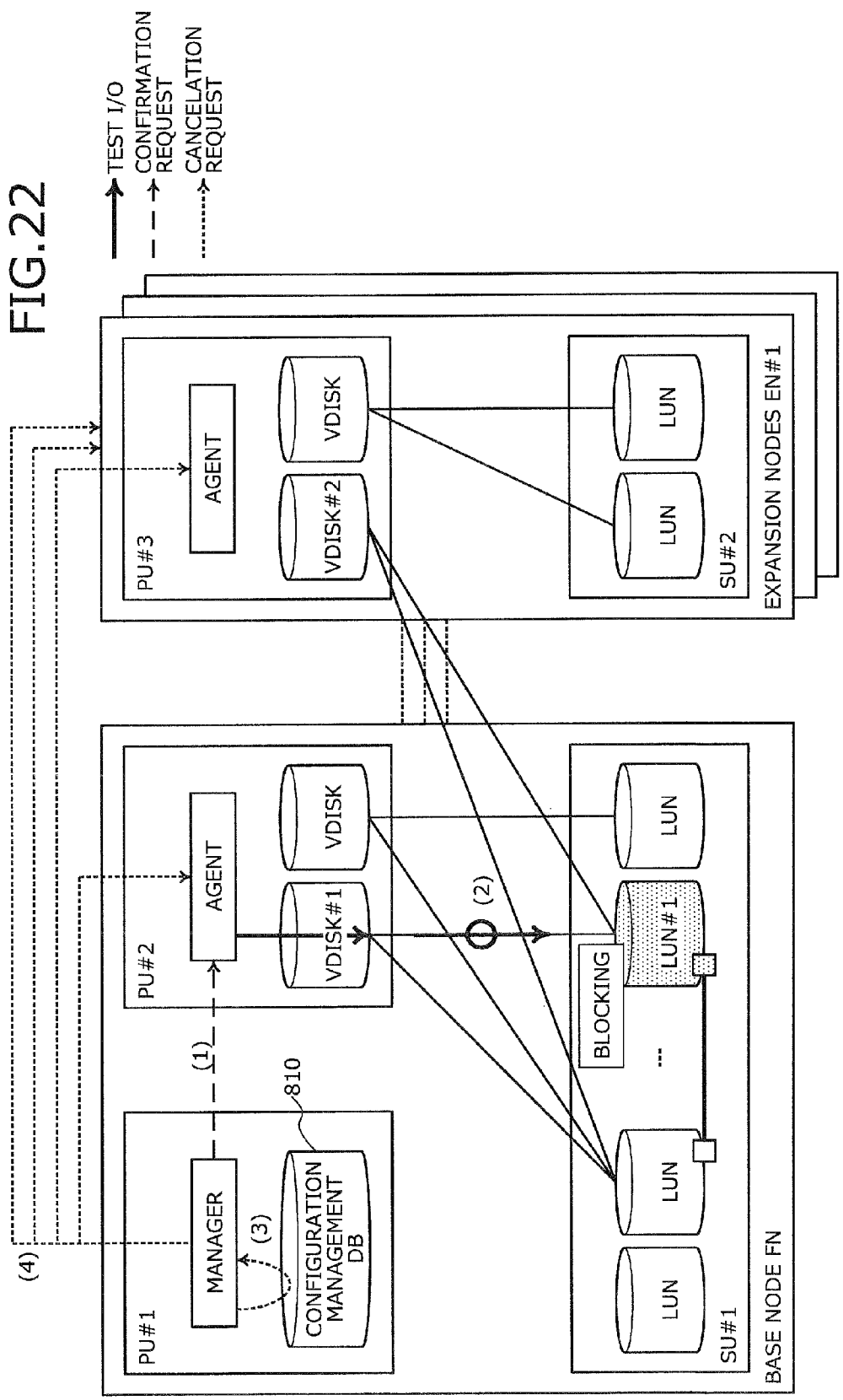

STORAGE SYSTEM, CONTROL APPARATUS, COMPUTER PRODUCT, AND CONTROL METHOD

CROSS REFERENCE TO RELATED APPLICATIONS

This application is based upon and claims the benefit of priority of the prior Japanese Patent Application No. 2013-095795, filed on Apr. 30, 2013, the entire contents of which are incorporated herein by reference.

FIELD

The embodiment discussed herein is related to a storage system, a control apparatus, a computer product, and a control method.

BACKGROUND

Storage for virtual environments, i.e., a so-called virtual storage apparatus, is conventionally known as a storage system capable of implementing a memory device having free volume configuration and memory capacity without restriction of volume configuration and memory capacity of a physical memory device. The virtual storage apparatus has within the apparatus a real storage apparatus controlling access to a physical memory device and creates a virtual volume by a processor managing the real storage apparatus.

The virtual volume is configured on processors in the virtual storage apparatus and is correlated with a physical memory area on the real storage apparatus. An agent present in each processor monitors an event such as control and error of a driver and notifies a manager. The manager is present in one processor in the virtual storage apparatus, manages configuration information and states of virtual volumes, and plays a role of controlling the agents.

The virtual storage apparatus mirrors, for example, a segment making up a virtual volume on the assumption that a failure occurs in the real storage apparatus storing data. The segment is an area of a constant size cut out from a logical unit number (LUN) of the real storage. The virtual storage apparatus continues access from the segment belonging to the LUN, at which a failure occurs, via a segment at a mirror destination assigned to belong to another LUN, thereby improving availability of storage.

Relevant prior art includes, for example, a technique of identifying a disk drive with a large repeat count of writing or reading of data out of multiple disk drives forming a logical memory area and blocking the identified disk drive. Also included is a technique of updating a counter in memory when a recoverable failure occurs and making an alarm notification to a manager if the count is equal to a threshold value. Alternatively, a failure occurrence frequency is calculated by hardware or software from failure information and date/time information recorded in an external memory device that records failure details and a failure occurrence time when a restorable failure occurs so as to determine whether an allowable value of the failure occurrence frequency has been exceeded. For examples of such techniques, refer to Japanese Laid-Open Patent Publication Nos. 2005-251042, H5-143377, and H6-103122.

However, conventional techniques have a problem of an increased period from the occurrence of an input/output error occurring in a real storage apparatus shared by multiple processors in a storage system until resumption of input/output via a mirror destination. For example, a process executed by a manager for the input/output error forms a bottleneck and therefore, a timeout time of an input/output request may be exceeded.

SUMMARY

According to an aspect of an embodiment, a storage system includes a first control apparatus; at least one second control apparatus that is managed by the first control apparatus; and a storage unit that can be accessed by the second control apparatuses. The second control apparatuses include a second processor that is configured to determine based on detection of an error of an input/output process for storage in the storage unit whether the storage is in a blocking state, execute a resumption process of the input/output process based on a determination of the storage being in the blocking state, judge whether an error occurrence frequency of the input/output process for the storage is at least a predetermined value, based on a determination of the storage not being in the blocking state, and transmit to the first control apparatus, a blocking process request for the storage, based on a judgment that the error occurrence frequency is at least the predetermined value. The first control apparatus includes a first processor that is configured to execute a blocking process of the storage, based on reception of the blocking process request, and execute an error process of the storage, based on reception of the blocking process request.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory view of an example of contents of a blocking flag table 400;

FIG. 5 is an explanatory view of an example of contents of a blocking list 500;

FIG. 6 is an explanatory view of an example of the contents of error time recording queues;

FIG. 7 is a block diagram of a functional configuration example of a second control apparatus 120;

FIG. 8 is a block diagram of a functional configuration example of a first control apparatus 110;

FIG. 10 is a flowchart of an example of an I/O resumption process procedure of the second control apparatus 120;

FIG. 11 is a flowchart of an example of a blocking list update process procedure of the second control apparatus 120;

FIG. 12 is a flowchart of an example of a control process procedure of the first control apparatus 110;

FIG. 15 is an explanatory view of an example of the contents of the segment table 1500;

FIG. 17 is an explanatory view of an error occurrence frequency of an I/O process;

FIG. 22 is an explanatory view of a blocking cancelation example of a LUN.

DESCRIPTION OF EMBODIMENTS

An embodiment of a storage system, a control apparatus, a computer product, and a control method will be described in detail with reference to the accompanying drawings.

Figure 1:
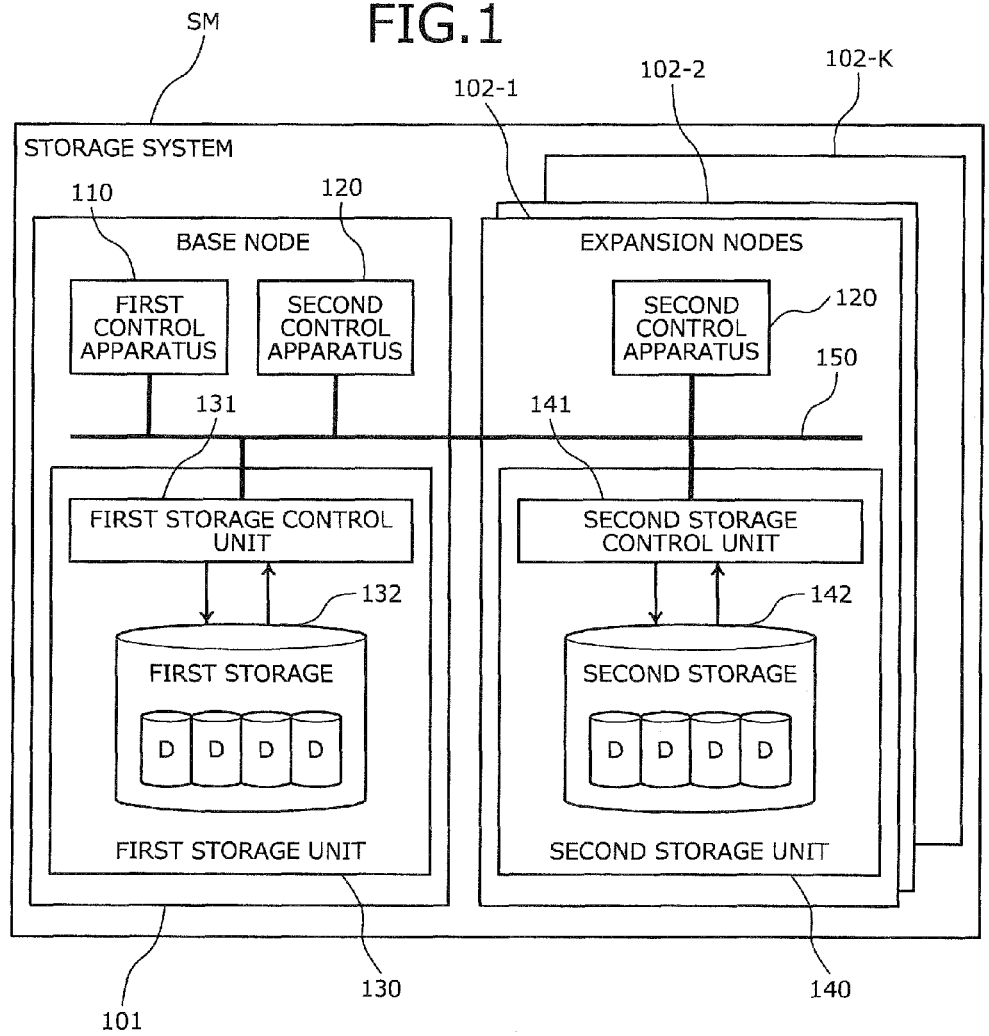
FIG. 1 is an explanatory view of an example of a storage system SM according to an embodiment.

FIG. 1 is an explanatory view of an example of a storage system SM according to the embodiment. In FIG. 1, the storage system SM includes a base node 101 and expansion nodes 102-1 to 102-K (K: natural number not less than two). In the following description, an arbitrary expansion node among the expansion nodes 102-1 to 102-K may be referred to as an "expansion node 102-$k$" ($k$=1, 2, ..., K).

The base node 101 has a first control apparatus 110, a second control apparatus 120, and a first storage unit 130 and can operate independently as a storage apparatus. The expansion node 102-$k$ has a second control apparatus 120 and a second storage unit 140.

The first storage unit 130 has a first storage control unit 131 and a first storage 132. The first storage control unit 131 controls access to the first storage 132. The second storage unit 140 has a second storage control unit 141 and a second storage 142. The second storage control unit 141 controls access to the second storage 142.

The first storage 132 and the second storage 142 respectively include one or more memory devices D. For example, the memory device D may be a physical memory device such as a hard disk, an optical disk, flash memory, and a magnetic tape, or may be a LUN that is a logical memory device.

The second control apparatus 120 and the second storage unit 140 of the expansion node 102-$k$ are so-called "members" added to the storage system SM and are incorporated into the storage system SM to act as a storage apparatus, for example.

The first control apparatus 110 is a computer controlling the multiple second control apparatuses 120 in the storage system SM. The first control apparatus 110 has a function of putting the second storage 142 into a usable state to expand the overall memory capacity of the storage system SM when the expansion node 102 is connected to the base node 101.

The first control apparatus 110 has not only a function of a manager of the first control apparatus 110 and the second control apparatus 120 but also a function of a control apparatus of storage that accesses the storage units 130 and 140. The first control apparatus 110 and the second control apparatus 120 in the base node 101 have a redundant configuration (even if one of the apparatuses fails, the other apparatus can operate) in preparation for a case of independent base node operation. For example, if the first control apparatus 110 fails, the second control apparatus 120 in the base node 101 operates as the first control apparatus 110.

The second control apparatus 120 is a computer that controls storage units subordinate thereto. For example, when the expansion node 102-$k$ is connected to the base node 101, the second control apparatus 120 manages the first storage 132 and the second storage 142 as the storage units subordinate thereto. The second control apparatus 120 accepts access to the first storage 132 and the second storage 142.

The first control apparatus 110, the second control apparatus 120, the first storage unit 130, and the second storage unit 140 are connected to each other through a communication channel 150 for inter-housing connection. Therefore, each of the second control apparatuses 120 in the storage system SM can directly access the first storage unit 130 and the second storage unit 140.

For example, the storage system SM performs data access through wide striping, for example. Wide striping can suppress performance deterioration due to access concentration and secure stable performance without complicated performance design in consideration of the amount of access by a higher-level apparatus such as a business server to the storage system SM and a physical position of a volume.

A volume is a memory area. The storage system SM is managed in units of memory areas. For example, the volume may be a logical volume acquired by grouping multiple physical storage apparatuses or partitions in a storage apparatus (e.g., hard disk) to virtually form one volume.

Although described in detail later with reference to FIG. 3, for example, a volume is an aggregate of multiple segment sets and each segment set is an aggregate of multiple segments. A segment is a memory area that is a unit of management prescribed by a predetermined capacity and is managed by positional information such as a record reproduction instruction address (LBA) from a host to a volume.

The storage system SM mirrors data stored in the memory device D on an assumption of a state in which a failure occurs in the memory device D storing data in the storage unit. When a failure occurs, the second control apparatus 120 can continue access via the memory device D at the mirror destination of the memory device D in which the failure occurs, thereby improving the availability of the storage system SM.

The storage system SM enables the expansion of the overall memory area of the storage system SM associated with an increase in required memory capacity. In the example depicted in FIG. 1, the expansion nodes 102-1 to 102-$k$ are sequentially added to the base node 101 to scale out the storage system SM. The addition of the second control apparatus 120 and the second storage unit 140 through node expansion enables the storage system SM to provide a larger number of volumes to the business server etc., as compared to the basic configuration.

However, for example, if a memory device D in a given storage unit fails after node expansion, a large amount of errors may occur in input/output processes for the failed memory device D. For example, when a given LUN is utilized for multiple virtual volumes, if one LUN fails, a large amount of errors may occur through a large number of volumes.

If error notification is made from the second control apparatus 120 to the first control apparatus 110 each time an error occurs in an input/output process, the error processes individually executed by the first control apparatus 110 may form a bottleneck, delaying resumption of the input/output process. For example, the input/output process of the business server issuing an input/output request is stopped during a period from the occurrence of error in the input/output process until the resumption and therefore, if this period is prolonged, the input/output process of the business server may fail due to timeout.

Therefore, in this embodiment, the second control apparatus 120 monitors the error occurrence frequency of the input/output process for the memory device D and, if the error occurrence frequency becomes greater than or equal to a predetermined value, the second control apparatus 120 requests the first control apparatus 110 to block the memory device D. Subsequently, when an error occurs in an input/output process for the blocked memory device D, the second control apparatus 120 resumes the input/output process without making error notification to the first control apparatus 110. As a result, the period from the occurrence of an error in the input/output process until the resumption is controlled. A control process example of the storage system SM will hereinafter be described.

(1) The second control apparatus 120 detects an error of an input/output process for storage $S_f$ in accessible storage units. For example, the accessible storage units in this case are the first storage unit 130 and the second storage units 140 of the expansion nodes 102-1 to 102-K.

For example, the storage $S_f$ is any of the memory devices D included in the first storage 132 and the second storages 142. An input/output process for the storage $S_f$ is a process of inputting data to the storage $S_f$ or outputting data from the storage $S_f$. In the following description, an input/output process may be referred to as an "I/O (Input/Output) process".

Occurrence factors of errors of I/O processes include, for example, temporary power interruptions of a storage unit, communication failure between the second control apparatus 120 and a storage unit, and a defect of software or hardware of a storage unit. For example, when receiving notification of a failure of an I/O process for the storage $S_f$ from a storage control unit (the first storage control unit 131 or the second storage control unit 141), the second control apparatus 120 detects an error of the I/O process for the storage $S_f$.

(2) If an error of the I/O process for the storage $S_f$ is detected, the second control apparatus 120 determines whether the storage $S_f$ is in a blocking state. A blocking state is a state in which the first control apparatus 110 is not notified of the error information of the storage $S_f$ when an error occurs in an I/O process for the storage $S_f$.

(3) If the storage $S_f$ is not in the blocking state, the second control apparatus 120 judges if an error occurrence frequency of an I/O process for the storage $S_f$ is greater than or equal to a predetermined value X. For example, the second control apparatus 120 judges if the number of times of occurrence of errors of an I/O process for the storage $S_f$ within a constant time T is greater than or equal to a predetermined number N (X=N/T).

(4) If the error occurrence frequency is greater than or equal to the predetermined value X, the second control apparatus 120 transmits a blocking process request for the storage $S_f$ to the first control apparatus 110. The blocking process request is made to request the first control apparatus 110 to execute a blocking process of the storage $S_f$.

(5) If the blocking process request is received, the first control apparatus 110 executes the blocking process of the storage $S_f$. The blocking process is a process of changing the state of the storage $S_f$ in the first control apparatus 110 to the blocking state and transmitting a blocking request to the second control apparatuses 120 in the storage system SM.

The blocking request is made to request the second control apparatuses 120 to change the storage $S_f$ to the blocking state. If the blocking request for the storage $S_f$ is received from the first control apparatus 110, the second control apparatuses 120 in the storage system SM change the state of the storage $S_f$ to the blocking state.

(6) The first control apparatus 110 executes an error process of the storage $S_f$. The error process is a process of duplicating data of storage at the mirror destination of the storage $S_f$ in which an error has occurred in an I/O process into an available storage to restore a mirror configuration.

(7) If the error process of the storage $S_f$ has been completed, the first control apparatus 110 transmits a resumption process request for the I/O process for the storage $S_f$ to the second control apparatus 120. The resumption process request is a request for accessing the storage at the mirror destination of the storage $S_f$ in which an error has occurred in an I/O process to resume the I/O process.

(8) If the resumption process request is received from the first control apparatus 110, the second control apparatus 120 executes the resumption process of the I/O process. For example, the second control apparatus 120 accesses the storage at the mirror destination of the storage $S_f$ in which the error has occurred in the I/O process error to resume the I/O process.

(9) If the storage $S_f$ having the error occurring in the I/O process is in the blocking state at (2), the second control apparatus 120 executes the resumption process of the I/O process. In particular, if the storage $S_f$ is in the blocking state, the second control apparatus 120 accesses the storage at the mirror destination of the storage $S_f$ to resume the I/O process without making error notification to the first control apparatus 110.

As described above, the second control apparatus 120 of the storage system SM can monitor the error occurrence frequency of the I/O process for the storage $S_f$ and transmit the blocking process request for the storage $S_f$ to the first control apparatus 110 if the error occurrence frequency is greater than or equal to the predetermined value X. The first control apparatus 110 of the storage system SM can execute the blocking process of the storage $S_f$ if the blocking process request is received from the second control apparatus 120. As a result, the state of the storage $S_f$ can be changed to the blocking state in the second control apparatuses 120 in the storage system SM.

When an error of an I/O process for the storage $S_f$ is detected, if the storage $S_f$ is in the blocking state, the second control apparatus 120 can execute the resumption process of the I/O process without making error notification to the first control apparatus 110. As a result, if the storage $S_f$ is in the blocking state, the I/O process is resumed without executing the error process in the first control apparatus 110 and therefore, the time from occurrence of an error in the I/O process until the resumption can be restrained.

In the following description, an "LUN" is taken as an example of a memory device D included in the first storage 132 and the second storages 142 in the storage system SM. A virtual volume provided by the storage system SM may be referred to as a "VDISK".

A hardware configuration example of the first control apparatus 110 and the second control apparatus 120 (herein, simply indicated as "control apparatus") depicted in FIG. 1 will be described.

Figure 2:
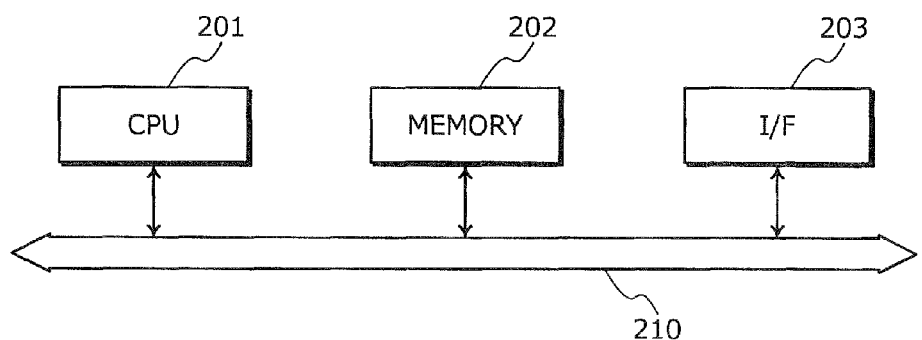
FIG. 2 is a block diagram of a hardware configuration example of control apparatuses.

FIG. 2 is a block diagram of a hardware configuration example of the control apparatuses. As depicted in FIG. 2, each control apparatus includes a central processing unit (CPU) 201, memory 202, and an interface (I/F) 203, respectively connected by a bus 210.

The CPU 201 governs overall control of the control apparatus. The memory 202 includes, for example, read-only memory (ROM), random access memory (RAM), and flash ROM. For example, the flash ROM stores programs such as an operating system (OS) and firmware; the ROM stores application programs; and the RAM is used as a work area of the CPU 201. Programs stored in the memory 202 are loaded onto the CPU 201, whereby coded processes are executed by the CPU 201.

The I/F 203 controls the input and output of data with respect to other computers. For example, the I/F 203 is connected, via a communication line, to a network such as a local area network (LAN), a wide area network (WAN), and the Internet, and is further connected to the other computers through the network. The I/F 203 administers an internal interface with the network and controls the input and output of data with respect to the other computers. The first storage control unit 131 and the second storage control unit 141 depicted in FIG. 1 can also be implemented by the same hardware configuration as the control apparatuses.

A configuration example of the VDISK provided by the storage system SM will be described.

Figure 3:
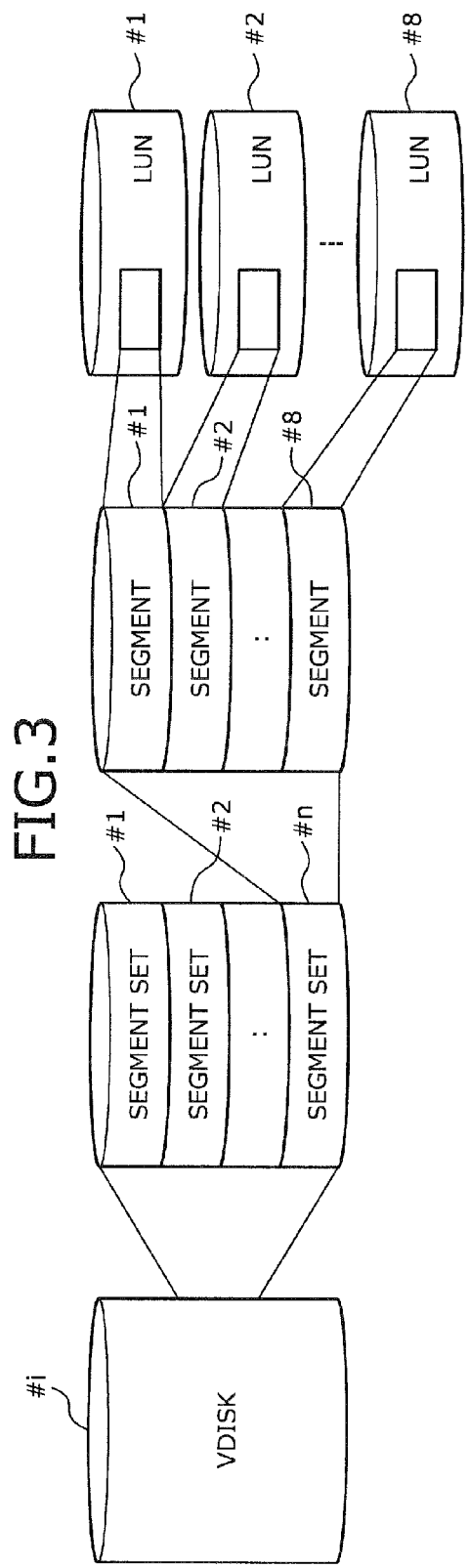
FIG. 3 is an explanatory view of a configuration example of a VDISK.

FIG. 3 is an explanatory view of a configuration example of the VDISK. In FIG. 3, a VDISK #i is an aggregate of multiple segment sets #1 to #n (i: natural number, n: natural number not less than two). Each of the segment sets #1 to #n is an aggregate of eight segments #1 to #8. The capacity of each of the segment sets #1 to #n is 2 [GB], for example. The capacity of each of the segments #1 to #8 is 256 [MB], for example.

The segments #1 to #8 are assigned respectively to the LUNs in the storage units included in the storage system SM. User data is recorded in terms of a strip having a fixed length (1 [MB]). This strip is striped by sequentially utilizing the segments #1 to #8. In the following description, an arbitrary LUN assigned to a segment making up a VDISK may be referred to as a "LUN #j".

Contents of a blocking flag table 400 used by the first control apparatus 110 will be described. The blocking flag table 400 is implemented by the memory 202 of the first control apparatus 110 depicted in FIG. 2, for example.

FIG. 4 is an explanatory view of an example of contents of the blocking flag table 400. In FIG. 4, the blocking flag table 400 has fields for a LUN and a blocking flag; and informations is set in the fields to store, as a record, a blocking state of each LUN in the storage units included in the storage system SM.

The LUN is a LUN in the storage units included in the storage system SM. The blocking flag is a flag that indicates the blocking state of the LUN. The blocking flag is set to "ON" to indicate that the LUN is in the blocking state and is set to "OFF" to indicate that the LUN is not in the blocking state. The blocking flag is set to "OFF" by default.

Contents of a blocking list 500 used by the second control apparatus 120 will be described. The blocking list 500 is implemented by the memory 202 of the second control apparatus 120 depicted in FIG. 2, for example.

FIG. 5 is an explanatory view of an example of contents of a blocking list 500. In FIG. 5, the blocking list 500 is information that indicates a LUN in the blocking among the multiple LUNs in the storage system SM. From the blocking list 500, it can be recognized that a LUN #2 and a LUN #5 are in the blocking state, for example.

Contents of error time recording queues Q1 and Q2 will be described. The error time recording queue Q1 is implemented by the memory 202 of the first control apparatus 110, for example. The error time recording queue Q2 is implemented by the memory 202 of the second control apparatus 120, for example.

FIG. 6 is an explanatory view of an example of the contents of the error time recording queues. In FIG. 6, the error time recording queues Q1 and Q2 are data structures in which data input first is output first. The error time recording queue Q1 stores Nm units of data. The error time recording queue Q2 stores Na units of data.

Stored data are, for example, a time of occurrence of an error in the LUN #j (e.g., 2012-07-28T11:35:59) and a position of occurrence of an error in the LUN #j (e.g., a sector number on a disk), which are correlated with information identifying the LUN #j (e.g., a LUN number: Storage001_LUN001).

Functional configuration examples of the first control apparatus 110 and the second control apparatus 120 will be described with reference to FIGS. 7 and 8. The functional configuration example of the second control apparatus 120 will be described first.

FIG. 7 is a block diagram of a functional configuration example of the second control apparatus 120. In FIG. 7, the second control apparatus 120 includes a detecting unit 701, a determining unit 702, a resumption process unit 703, a calculating unit 704, a judging unit 705, a transmitting unit 706, and a receiving unit 707. For example, the functions of the functional units are implemented by causing the CPU 201 to execute a program stored in the memory 202 of the second control apparatus 120 depicted in FIG. 2, or via the I/F 203. Processing results of the functional units are stored to the memory 202, for example.

The detecting unit 701 has a function of detecting an error of an I/O process for a segment of a LUN #j in a storage unit. The LUN #j is a LUN assigned to a segment making up a VDISK (volume) created on the second control apparatus 120. The LUN #j is utilized by multiple VDISKs.

For example, the detecting unit 701 detects an error of an I/O process for a segment of the LUN #j if error notification of the I/O process for the segment of the LUN #j is received from a storage control unit (the first storage control unit 131 or the second storage control unit 141) controlling access to the segment of the LUN #j.

The detected detection result is stored in the error time recording queue Q2 depicted in FIG. 6, for example. For example, the error time recording queue Q2 records as error information an error occurrence time when the error occurs in the segment of the LUN #j, and a position of occurrence of the error in the segment of the LUN #j. This enables monitoring of the error occurrence frequency of the I/O process for the segment of the LUN #j assigned to the segment making up the VDISK created on the second control apparatus 120.

The determining unit 702 has a function of determining whether the LUN #j is in the blocking state based on the detection of an error of an I/O process for the segment of the LUN #j by the detecting unit 701. For example, the determining unit 702 determines whether the LUN #j is in the blocking state if an error of an I/O process for the segment of the LUN #j is detected.

For example, if the LUN #j is registered in the blocking list 500 (see FIG. 5), the determining unit 702 determines that the LUN #j is in the blocking state. In contrast, if the LUN #j is not registered in the blocking list 500, the determining unit 702 determines that the LUN #j is not in the blocking state.

The resumption process unit 703 has a function of executing a resumption process of an I/O process for the segment of the LUN #j having an error of the I/O process detected. For example, the resumption process unit 703 executes the resumption process of the I/O process for the segment of the LUN #j if the determining unit 702 determines that the LUN #j is in the blocking state.

For example, the resumption process unit 703 refers to configuration information stored in a storage unit 710 to identify a segment at the mirror destination of the segment of the LUN #j having an error of the I/O process detected and executes the I/O process for the segment at the mirror destination. The configuration information is information that indicates a configuration of the memory area of the first storage 132 and a configuration of the memory area of the second storage 142.

For example, the configuration information includes information that indicates to which LUN in the first storage 132 and the second storage 142 the segment making up the VDISK is assigned and information that indicates segments at the mirror destinations of respective segments. The configuration information is read and acquired from a configuration management DB 810 (see FIG. 8) of the first control apparatus 110. The storage unit 710 is implemented by the memory 202 of the second control apparatus 120, for example.

The calculating unit 704 has a function of calculating a predetermined value Xa defined as a blocking condition of the LUN #j based on a total number $V_{all}$ of the VDISKs (volumes) created on the multiple second control apparatuses 120 in the storage system SM, a total number $A_{all}$ of the second control apparatuses 120, and input/output per second (iops) of the second control apparatuses 120.

The total number $V_{all}$ of the VDISKs and the total number $A_{all}$ of the second control apparatuses 120 are supplied from the first control apparatus 110 to the second control apparatus 120 at the time of a change in configuration of the storage system SM, for example. The total number $V_{all}$ of the VDISKs may be identified from the configuration information stored in the storage unit 710.

The iops is an average number of I/O requests to the VDISKs issued per second in the second control apparatus 120. For example, the iops is measured by the second control apparatus 120. For example, the calculating unit 704 can calculate the predetermined value Xa defined as the blocking condition of the LUN #j by using Equation (1).

$$Xa=(V_{all}/A_{all})\cdot iops \text{ [errors/sec]} \quad (1)$$

The blocking condition of the LUN #j will be described in detail later with reference to FIG. 17.

The judging unit 705 has a function of judging if the error occurrence frequency of the I/O process for the segment of the LUN #j is greater than or equal to the predetermined value Xa based on the determination of the determining unit 702 indicating that the LUN #j is not in the blocking state. For example, if it is determined that the LUN #j is not in the blocking state, the judging unit 705 judges if the error occurrence frequency of the I/O process for the segment of the LUN #j is greater than or equal to the predetermined value Xa.

For example, the judging unit 705 acquires the oldest error information (data of the error that occurred Na times before) and the newest error information (data of the error occurring this time) from the error time recording queue Q2.

The judging unit 705 calculates a difference time Δta between an error time ta1 of the newest error information and an error time ta2 of the oldest error information. The difference time Δta is an elapsed time from the error time ta2 of the oldest error information to the error time ta1 of the newest error information. The judging unit 705 judges if the calculated difference time Δta is less than or equal to a threshold value Ta.

If the difference time Δta is less than or equal to the threshold value Ta, the judging unit 705 judges that the error occurrence frequency of the I/O process for the segment of the LUN #j is greater than or equal to the predetermined value Xa. In contrast, if the difference time Δta is greater than the threshold value Ta, the judging unit 705 judges that the error occurrence frequency of the I/O process for the segment of the LUN #j is less than the predetermined value Xa.

A maximum data number Na stored in the error time recording queue Q2 is derived from the predetermined value Xa calculated by the calculating unit 704, for example. For example, assuming that the threshold value Ta is 1 [sec], the maximum data number Na is "Na=Xa". The threshold value Ta may be set in advance and stored in the memory 202, for example.

The transmitting unit 706 has a function of transmitting the blocking process request for the LUN #j to the first control apparatus 110 based on the judgment of the judging unit 705 indicating that the error occurrence frequency is greater than or equal to the predetermined value Xa. For example, if it is judged that the error occurrence frequency is greater than or equal to the predetermined value Xa, the transmitting unit 706 transmits the blocking process request of the LUN #j to the first control apparatus 110. The blocking process request is made to request the first control apparatus 110 to execute the blocking process of the LUN #j.

The transmitting unit 706 has a function of transmitting error information that indicates occurrence of an error of the I/O process for the segment of the LUN #j to the first control apparatus 110 based on the judgment that the error occurrence frequency is less than the predetermined value Xa. For example, if it is judged that the error occurrence frequency is less than the predetermined value Xa, the transmitting unit 706 acquires the newest error information (data of the error occurring this time) from the error time recording queue Q2 and transmits the newest error information to the first control apparatus 110.

The receiving unit 707 has a function of receiving the resumption process request from the first control apparatus 110. The resumption process request is a request for accessing the segment at the mirror destination of the segment of the LUN #j in which the error has occurred in the I/O process to resume the I/O process. The resumption process unit 703 executes the resumption process of the I/O process for the segment of the LUN #j if the receiving unit 707 receives the resumption process request.

The receiving unit 707 has a function of receiving the blocking request for the LUN #j from the first control apparatus 110. The blocking request is made to request the second control apparatus 120 to change the LUN #j to the blocking state. The blocking request includes the information identifying the LUN #j (e.g., a LUN number). If the blocking request is received, the information identifying the LUN #j is stored in the blocking list 500. As a result, the LUN #j can be changed to the blocking state.

The receiving unit 707 has a function of receiving a blocking cancelation request for the LUN #j from the first control apparatus 110. The blocking cancelation request is made to request the second control apparatus 120 to cancel the blocking state of the LUN #j. The blocking cancelation request includes the information identifying the LUN #j. If the blocking cancelation request is received, the information of the LUN #j subjected to the blocking cancelation is deleted from the blocking list 500. As a result, the blocking state of the LUN #j can be canceled.

A functional configuration example of the first control apparatus 110 will be described.

FIG. 8 is a block diagram of a functional configuration example of the first control apparatus 110. In FIG. 8, the first control apparatus 110 includes a receiving unit 801, a blocking process unit 802, an error process unit 803, a determining unit 804, a judging unit 805, a transmitting unit 806, and a blocking canceling unit 807. For example, the functions of the functional units are implemented by causing the CPU 201 to execute a program stored in the memory 202 of the first control apparatus 110 depicted in FIG. 2 or by the I/F 203. Processing results of the functional units are stored in the memory 202, for example.

The receiving unit 801 has a function of receiving the blocking process request for the LUN #j from the second control apparatus 120. The receiving unit 801 has a function of receiving the error information of the segment of the LUN #j from the second control apparatus 120. The received error information of the segment of the LUN #j is stored in the error time recording queue Q1 depicted in FIG. 6, for example.

The blocking process unit 802 has a function of executing the blocking process of the LUN #j based on the reception of the blocking process request by the receiving unit 801. The blocking process is a process of changing the state of the LUN #j in the first control apparatus 110 to the blocking state and transmitting the blocking request for the LUN #j to the second control apparatuses 120 in the storage system SM.

For example, if a blocking process request is received, the blocking process unit 802 changes the blocking flag of the LUN #j from "OFF" to "ON" in the blocking flag table 400 depicted in FIG. 4. The blocking process unit 802 then transmits the blocking request for the LUN #j to the second control apparatuses 120 in the storage system SM.

The error process unit 803 has a function of executing the error process of the I/O process for the segment of the LUN #j. For example, if the receiving unit 801 receives the blocking process request, the error process unit 803 executes the error process of the I/O process for the segment of the LUN #j. When the receiving unit 801 receives the error information, the error process unit executes the error process of the I/O process for the segment of the LUN #j. The error process is a process of duplicating data of the segment at the mirror destination of the LUN #j in which the error has occurred in the I/O process into a segment of an available LUN to restore a mirror configuration.

For example, the error process unit 803 refers to the configuration management DB 810 to execute the error process of the segment of the LUN #j. The configuration management DB 810 is a database storing configuration information that indicates a configuration of the memory area of the first storage 132 and a configuration of the memory area of the second storage 142. The error process will particularly be described later with reference to FIG. 16.

The determining unit 804 has a function of determining whether the LUN #j is in the blocking state based on the reception of the error information by the receiving unit 801. For example, if the error information is received, the determining unit 804 refers to the blocking flag table 400 and determines that the LUN #j is in the blocking state if the blocking flag of the LUN #j is "ON". In contrast, the determining unit 804 determines that the LUN #j is not in the blocking state if the blocking flag of the LUN #j is "OFF".

The judging unit 805 has a function of judging if the error occurrence frequency of the I/O process for the LUN #j is greater than or equal to a predetermined value Xm based on the determination of the determining unit 804 indicating that the LUN #j is not in the blocking state. The predetermined value Xm is a value defined as the blocking condition of the LUN #j. For example, the predetermined value Xm is set by using Equation (2). $P_{mgr}$ is a processing time required for the error process of the LUN #j in the first control apparatus 110. $P_{mgr}$ is set depending on the processing performance of the first control apparatus 110.

$$Xm=(1/P_{mgr}) \text{ [errors/sec]} \qquad (2)$$

For example, if it is determined that the LUN #j is not in the blocking state, the judging unit 805 acquires the oldest error information (data of the error that occurred Nm times before) and the newest error information (data of the error occurring this time) from the error time recording queue Q1. The judging unit 805 calculates a difference time Δtm between an error time tm1 of the newest error information and an error time tm2 of the oldest error information. The difference time Δtm is the elapsed time from the error time tm2 of the oldest error information until the error time tm1 of the newest error information. The judging unit 805 judges if the calculated difference time Δtm is less than or equal to a threshold value Tm.

If the difference time Δtm is less than or equal to the threshold value Tm, the judging unit 805 judges that the error occurrence frequency of the I/O process for the segment of the LUN #j is greater than or equal to the predetermined value Xm. In this case, the judging unit 805 changes the blocking flag of the LUN #j from "OFF" to "ON" in the blocking flag table 400. In contrast, if the difference time Δtm is greater than the threshold value Tm, the judging unit 805 judges that the error occurrence frequency of the I/O process for the segment of the LUN #j is less than the predetermined value Xm.

A maximum data number Nm stored in the error time recording queue Q1 is derived from the predetermined value Xm, for example. For example, assuming that the threshold value Tm is 1 [sec], the maximum data number Nm is "Nm=Xm". The threshold value Tm is set in advance and stored in the memory 202, for example.

The transmitting unit 806 has a function of transmitting the blocking request for the LUN #j to the second control apparatuses 120 in the storage system SM. For example, if the judging unit 805 judges that the error occurrence frequency of the I/O process for the segment of the LUN #j is greater than or equal to the predetermined value Xm, the transmitting unit 806 transmits the blocking request for the LUN #j to the second control apparatuses 120 in the storage system SM.

The transmitting unit 806 has a function of transmitting a resumption process request for the I/O process for the segment of the LUN #j to the second control apparatus 120. For example, if the error process of the segment of the LUN #j is executed, the transmitting unit 806 transmits the resumption process request for the I/O process for the segment of the LUN #j to the second control apparatus 120. The second control apparatus 120 defined as the transmission destination of the resumption process request is the second control apparatus 120 that is the transmission source of the blocking process request or the error information.

The blocking canceling unit 807 has a function of canceling the blocking state of the LUN #j. For example, the blocking canceling unit 807 controls the second control apparatus 120 to issue a test I/O request for the LUN #j in the blocking state. The LUN #j in the blocking state is a LUN having the blocking flag of "ON" in the blocking flag table 400, for example.

If the test I/O request is normally processed, the blocking canceling unit 807 cancels the blocking state of the LUN #j. In this case, the blocking canceling unit 807 changes the blocking flag corresponding to the LUN #j having the blocking state canceled in the blocking flag table 400 from "ON" to "OFF". The blocking canceling unit 807 transmits a blocking cancelation request for the LUN #j to the second control apparatuses 120 in the storage system SM.

Various process procedures of the second control apparatus 120 will be described. A control process procedure of the second control apparatus 120 will first be described.

Figure 9:
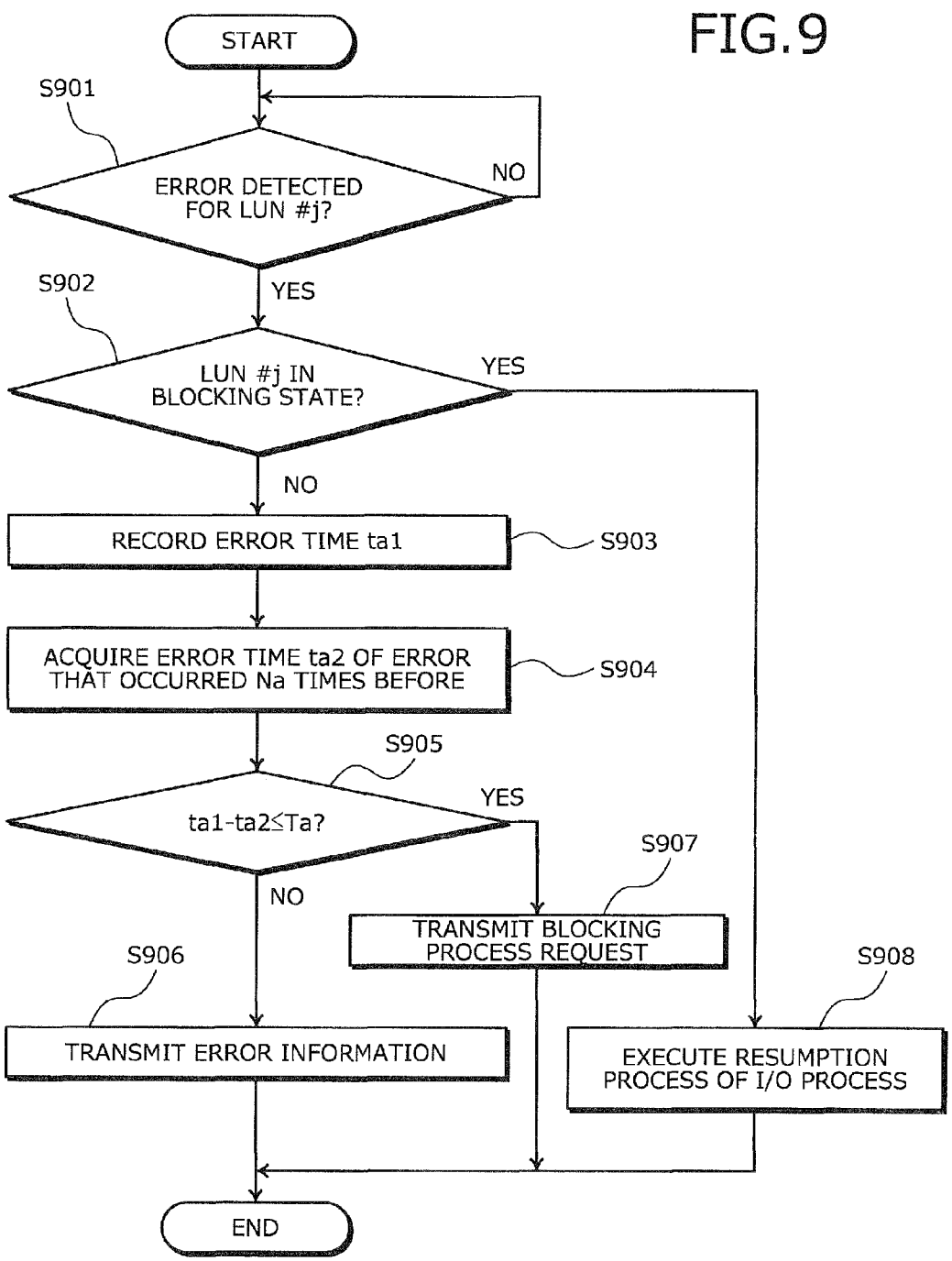
FIG. 9 is a flowchart of an example of a control process procedure of the second control apparatus 120.

FIG. 9 is a flowchart of an example of the control process procedure of the second control apparatus 120. In the flowchart of FIG. 9, first, the second control apparatus 120 determines whether an error is detected in an I/O process for a segment of any LUN #j in the storage unit (step S901).

The second control apparatus 120 waits for detection of an error (step S901: NO). If an error is detected (step S901: YES), the second control apparatus 120 determines whether the LUN #j is in the blocking state (step S902).

If the LUN #j is not in the blocking state (step S902: NO), the second control apparatus 120 records the error time ta1 into the error time recording queue Q2 (step S903). The second control apparatus 120 acquires the error time ta2 of the error that occurred Na times before from the error time recording queue Q2 (step S904).

The second control apparatus 120 judges if the difference time Δta between the error time ta1 and the error time ta2 is less than or equal to the threshold value Ta (step S905). If the difference time Δta is greater than the threshold value Ta (step S905: NO), the second control apparatus 120 transmits the error information of the segment of the LUN #j to the first control apparatus 110 (step S906) and terminates a series of processes of this flowchart.

On the other hand, if the difference time Δta is less than or equal to the threshold value Ta (step S905: YES), the second control apparatus 120 transmits the blocking process request for the LUN #j to the first control apparatus 110 (step S907) and terminates a series of processes of this flowchart.

If the LUN #j is in the blocking state at step S902 (step S902: YES), the second control apparatus 120 executes the resumption process of the I/O process for the segment of the LUN #j in which the error has occurred (step S908) and terminates a series of processes of this flowchart.

This enables monitoring of the error occurrence frequency of the I/O process for the segment of the LUN #j and, if the error occurrence frequency is greater than or equal to the predetermined value Xa, the blocking process request for the LUN #j can be transmitted to the first control apparatus 110. When an error of an I/O process for the segment of the LUN #j is detected, if the LUN #j is in the blocking state, the resumption process of the I/O process can be executed without making an error notification to the first control apparatus 110.

An I/O resumption process procedure of the second control apparatus 120 will be described.

FIG. 10 is a flowchart of an example of the I/O resumption process procedure of the second control apparatus 120. In FIG. 10, the second control apparatus 120 determines whether the resumption process request has been received from the first control apparatus 110 (step S1001).

The second control apparatus 120 waits for reception of the resumption process request (step S1001: NO). When the resumption process request is received (step S1001: YES), the second control apparatus 120 executes the resumption process of the I/O process for the segment of the LUN #j in which the error has occurred (step S1002) and terminates a series of processes of this flowchart.

As a result, if the resumption process request is received from the first control apparatus 110, the resumption process of the I/O process can be executed.

A blocking list update process procedure of the second control apparatus 120 will be described FIG. 11 is a flowchart of an example of the blocking list update process procedure of the second control apparatus 120. In the flowchart of FIG. 11, first, the second control apparatus 120 determines whether the blocking request for the LUN #j has been received from the first control apparatus 110 (step S1101).

If the blocking request has been received (step S1101: YES), the second control apparatus 120 registers the information identifying the LUN #j included in the blocking request to the blocking list 500 (step S1102) and terminates a series of processes of this flowchart.

In contrast, if the blocking request has not been received (step S1101: NO), the second control apparatus 120 determines whether the blocking cancelation request for the LUN #j has been received from the first control apparatus 110 (step S1103). If the blocking cancelation request has not been received (step S1103: NO), the second control apparatus 120 returns to step S1101.

On the other hand, if the blocking cancelation request has been received (step S1103: YES), the second control apparatus 120 deletes the information of the LUN #j subjected to the blocking cancelation from the blocking list 500 (step S1104) and terminates a series of processes of this flowchart. This enables management of the blocking state of the LUN #j.

Various process procedures of the first control apparatus 110 will be described. A control process procedure of the first control apparatus 110 will first be described.

FIG. 12 is a flowchart of an example of the control process procedure of the first control apparatus 110. In the flowchart of FIG. 12, first, the first control apparatus 110 determines whether the error information of the segment of the LUN #j has been received from the second control apparatus 120 (step S1201).

The first control apparatus 110 waits for reception of the error information of the segment of the LUN #j (step S1201: NO). When the error information of the segment of the LUN #j has been received (step S1201: YES), the first control apparatus 110 determines whether the blocking flag of the LUN #j is "ON" in the blocking flag table 400 (step S1202).

If the blocking flag of the LUN #j is "ON" (step S1202: YES), the first control apparatus 110 goes to step S1208. In contrast, if the blocking flag of the LUN #j is "OFF" (step S1202: NO), the first control apparatus 110 records the error time tm1 into the error time recording queue Q1 (step S1203).

The first control apparatus 110 acquires the error time tm2 of the error that occurred Nm times before from the error time recording queue Q1 (step S1204). The first control apparatus 110 judges if the difference time Δtm between the error time tm1 and the error time tm2 is less than or equal to the threshold value Tm (step S1205).

If the difference time Δtm is greater than the threshold value Tm (step S1205: NO), the first control apparatus 110 goes to step S1208. On the other hand, if the difference time Δtm is less than or equal to the threshold value Tm (step S1205: YES), the first control apparatus 110 changes the blocking flag of the LUN #j from "OFF" to "ON" in the blocking flag table 400 (step S1206).

The first control apparatus 110 transmits the blocking request for the LUN #j to the second control apparatuses 120 of the expansion nodes 102-1 to 102-K (step S1207). The first control apparatus 110 executes the error process of the segment of the LUN #j (step S1208). The first control apparatus 110 transmits a resumption process request for the I/O process for the segment of the LUN #j to the second control apparatus 120 (step S1209) and terminates a series of processes of this flowchart.

This enables monitoring of the error occurrence frequency of the I/O process for the segment of the LUN #j in the second control apparatuses 120 in the storage system SM and, if the error occurrence frequency is greater than or equal to the predetermined value Xm, the blocking request for the LUN #j can be transmitted to the second control apparatuses 120.

A blocking process procedure of the first control apparatus 110 will be described.

Figure 13:
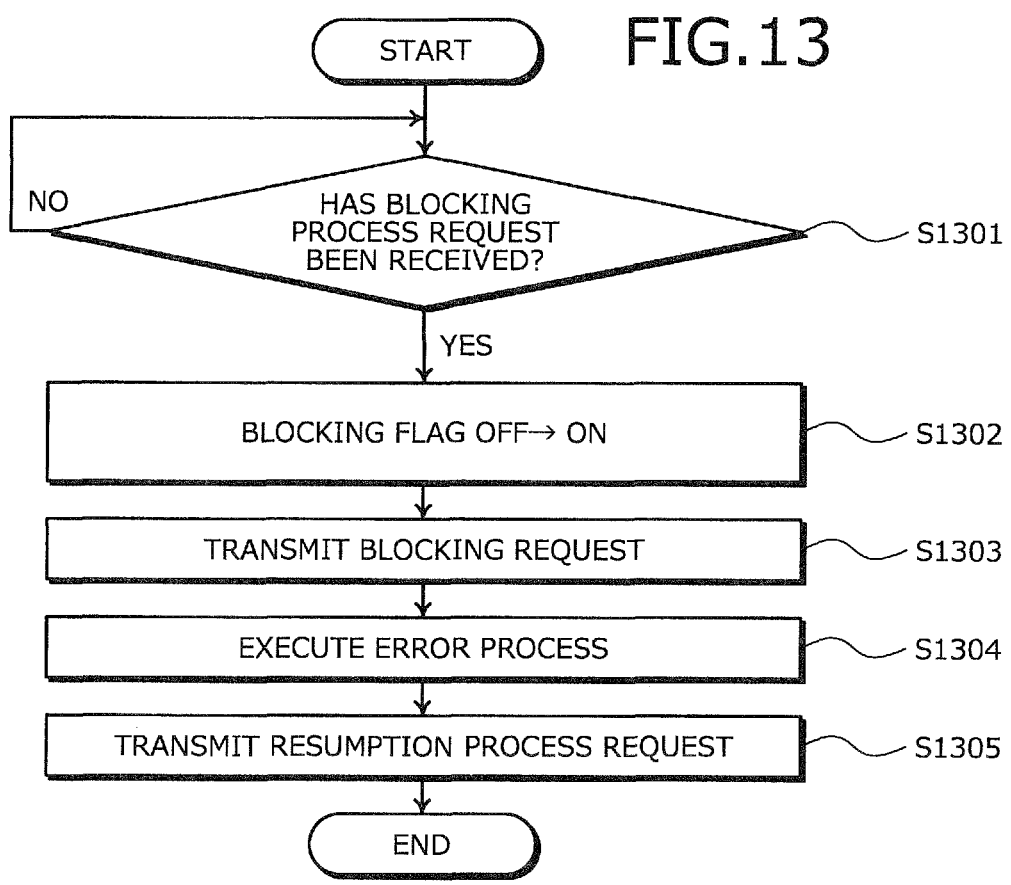
FIG. 13 is a flowchart of an example of a blocking process procedure of the first control apparatus 110.

FIG. 13 is a flowchart of an example of the blocking process procedure of the first control apparatus 110. In the flowchart of FIG. 13, first, the first control apparatus 110 determines whether a blocking process request for the LUN #j has been received from the second control apparatus 120 (step S1301). The first control apparatus 110 waits for reception of the blocking process request (step S1301: NO).

When the blocking process request has been received (step S1301: YES), the first control apparatus 110 changes the blocking flag of the LUN #j from "OFF" to "ON" in the blocking flag table 400 (step S1302). The first control apparatus 110 transmits the blocking request for the LUN #j to the second control apparatuses 120 of the expansion nodes 102-1 to 102-K (step S1303).

The first control apparatus 110 executes the error process of the segment of the LUN #j (step S1304). The first control apparatus 110 transmits the resumption process request for the I/O process for the segment of the LUN #j to the second control apparatus 120 (step S1305) and terminates a series of processes of this flowchart.

As a result, if the blocking process request for the LUN #j is received from the second control apparatuses 120, the blocking request for the LUN #j can be transmitted to the second control apparatuses 120 in the storage system SM.

As described above, if an error of an I/O process for the segment of the LUN #j is detected, the second control apparatus 120 according to the embodiment can determine whether the LUN #j is in the blocking state. If the LUN #j is not in the blocking state, the second control apparatus 120 can judge if the error occurrence frequency of the I/O process for the LUN #j is greater than or equal to the predetermined value Xa. If the error occurrence frequency is greater than or equal to the predetermined value Xa, the second control apparatus 120 can transmit the blocking process request for the LUN #j to the first control apparatus 110.

If the LUN #j is in the blocking state, the second control apparatus 120 can execute the resumption process of the I/O process without making an error notification to the first control apparatus 110. As a result, if the LUN #j is in the blocking state, the I/O process is resumed without executing the error process in the first control apparatus 110 and therefore, the time from occurrence of an error in the I/O process until the resumption can be restrained.

If the blocking process request for the LUN #j is received from the second control apparatus 120, the first control apparatus 110 according to the embodiment can execute the blocking process of the LUN #j. As a result, the state of the LUN #j can be changed to the blocking state in the second control apparatuses 120 in the storage system SM.

If the error occurrence frequency is less than the predetermined value Xa, the second control apparatus 120 can transmit the error information of the I/O process for the segment of the LUN #j to the first control apparatus 110. If the error information of the segment of the LUN #j is received from the second control apparatus 120, the first control apparatus 110 can executed the error process of the I/O process for the segment of the LUN #j. As a result, the mirror configuration of the segment making up the VKISK can be restored.

If the error information of the segment of the LUN #j is received from the second control apparatus 120, the first control apparatus 110 can judge if the error occurrence frequency of the I/O process for the LUN #j is greater than or equal to the predetermined value Xm. If the error occurrence frequency is greater than or equal to the predetermined value Xm, the first control apparatus 110 can transmit the blocking request for the LUN #j to the second control apparatuses 120 in the storage system SM. As a result, even when the error occurrence frequency of the I/O process for the LUN #j in each of the second control apparatuses 120 is less than the predetermined value Xa, if the error occurrence frequency of the I/O process for the LUN #j becomes high in the overall system, the LUN #j can be changed to the blocking state.

The second control apparatus 120 can calculate the predetermined value Xa defined as the blocking condition of the LUN #j based on the total number V of the VDISKs (volumes) created on the multiple second control apparatuses 120, the total number $A_{all}$ of the second control apparatuses 120, and the iops of the second control apparatus 120. As a result, the predetermined value Xa defined as the blocking condition of the LUN #j can be set depending on a system configuration of the storage system SM.

An example of the storage system SM according to the embodiment will be described. The same portions as the portions described in the embodiment will not be depicted and described.

Figure 14:
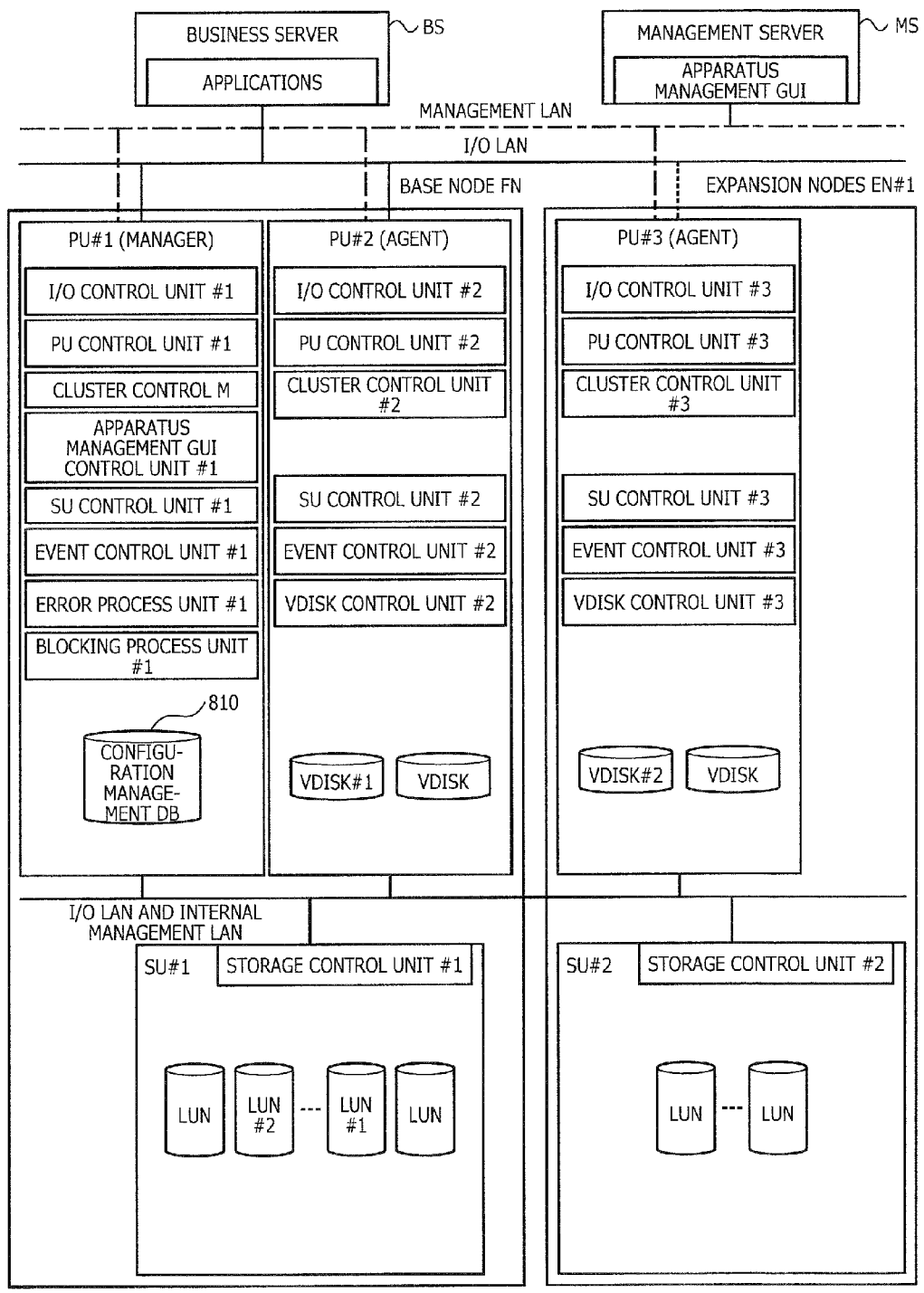
FIG. 14 is an explanatory view of a system configuration example of the storage system SM according to an example.

FIG. 14 is an explanatory view of a system configuration example of a storage system SM according to the example. In FIG. 14, the storage system SM includes a base node FN and an expansion node EN#1. The base node 101 depicted in FIG. 1 corresponds to the base node FN, for example. The expansion node 102-1 depicted in FIG. 1 corresponds to the expansion node EN#1.

The base node FN includes a processor unit (PU) #1 a PU #2, and a storage unit (SU) #1. The expansion node EN#1 includes a PU #3 and a SU #2. The PU #1 is a computer controlling the PU #2 and the PU #3 and is a so-called "manager". The first control apparatus 110 depicted in FIG. 1 corresponds to the PU #1, for example. The PU #2 and the PU #3 are computers controlling the SU #1 and the SU #2 and are so-called "agents".

The SU #1 has a storage control unit #1 and controls access to multiple LUNs (e.g., a LUN #1 and a LUN #2). The SU #2 has a storage control unit #2 and controls access to multiple LUNs. The storage control units #1 and #2 are implemented by a CPU executing a storage control program. The storage control program is a program controlling access to storages in the SUs #1 and #2.

The first storage unit 130 depicted in FIG. 1 corresponds to the SU #1, for example. The first storage control unit 131 depicted in FIG. 1 corresponds to the storage control unit #1, for example. The memory devices D depicted in FIG. 1 correspond to the LUNs, for example. The second storage unit 140 depicted in FIG. 1 corresponds to the SU #2, for example. The second storage control unit 141 depicted in FIG. 1 corresponds to the storage control unit #2, for example.

The storage system SM enables expansion of an overall memory area of the storage system SM on the basis of a PU and a SU considered as a set. The storage system SM depicted in FIG. 14 is an example when the base node FN is expanded by the expansion node EN#1 (the PU #3 + the SU #2).

In the storage system SM, the PU #1 and the PU #2 in the base node FN, the PU #3 in the expansion node EN#1, and a management server MS are connected via a management LAN. The management server MS is a computer used by an administrator of the storage system SM and has an apparatus management graphical user interface (GUI).

In the storage system SM, the PU #1 and the PU #2 in the base node FN, the PU #3 in the expansion node EN#1, and a business server BS are connected via an I/O LAN. The business server BS is a computer with business applications installed. The PU #1, the PU #2, the PU #3, the SU #1, and the SU #2 are connected via the I/O LAN and an internal management LAN.

The PU #1 includes a configuration management DB 810, an I/O control unit #1, a PU control unit #1, a cluster control M, an apparatus management GUI control unit #1, a SU control unit #1, an event control unit #1, an error process unit #1, and a blocking process unit #1. The determining unit 804 and the judging unit 805 depicted in FIG. 8 correspond to the event control unit #1, for example. The error process unit 803 depicted in FIG. 8 corresponds to the error process unit #1, for example. The blocking process unit 802 depicted in FIG. 8 corresponds to the blocking process unit #1, for example.

The PU #2 includes an I/O control unit #2, a PU control unit #2, a cluster control unit #2, a SU control unit #2, an event control unit #2, and a VDISK control unit #2. The PU #3 includes an I/O control unit #3, a PU control unit #3, a cluster control unit #3, a SU control unit #3, an event control unit #3, and a VDISK control unit #3. The detecting unit 701, the determining unit 702, the calculating unit 704, and the judging unit 705 depicted in FIG. 7 correspond to the VDISK control units #2 and #3, for example. The resumption process unit 703 depicted in FIG. 7 corresponds to the VDISK control units #2, #3 and the SU control units #2, #3, for example.

The configuration management DB 810 stores information for managing the VDISKs (volumes) created on the storage system SM, information for managing a segment of each volume (e.g., a segment table 1500 described later), the blocking flag table 400 (see FIG. 4), etc. The contents of the segment table 1500 will be described later with reference to FIG. 15.

The I/O control units #1 to #3 accept and process an I/O request from the business server BS. The PU control units #1 to #3 control the PUs #1 to #3. The cluster control M clusters PUs with each other. In this example, the PU #1, the PU #2, and the PU #3 form a cluster. The cluster control units #2 and #3 recognize the PUs #1 to #3 clustered by the cluster control M.

The apparatus management GUI control unit #1 determines the state of the storage system SM and creates a new volume according to an instruction from the management server MS. The SU control units #1 to #3 control the SUs #1 and #2. The event control units #1 to #3 control various events. The events include, for example, an event of an error process of the I/O process for the segment of the LUN #j, an event of changing a state of the segment of the VDISK, and an event of resuming the I/O process.

The error processing unit #1 executes an error process of the I/O process for the segment of the LUN #j. The blocking process unit #1 executes the blocking process of the LUN #j. The VDISK control units #2 and #3 control the VDISKs created on the PUs #2 and #3. In the following description, by way of example, the PUs #2 and #3 accept and process I/O requests from the business server BS.

If the PU #1 is down in the storage system SM, for example, the PU #2 or the PU #3 takes over the function of the PU #1. The hardware configurations of the business server BS and the management server MS are implemented by a CPU, memory, a magnetic disk drive, a magnetic disk, a display, an I/F, a keyboard, a mouse, etc.

FIG. 15 is an explanatory view of an example of the contents of the segment table 1500. In FIG. 15, the segment table 1500 has fields of a volume number, a segment set number, a segment number, a SU number, a LUN number, and a segment state. Information is set in the fields to store segment information (e.g., segment information 1500-1, 1500-2) as a record.

The volume number is an identifier of a VDISK. The segment set number is an identifier of a segment set making up a VDISK. The segment number is an identifier of a segment making up a segment set. The volume number, the segment set number, and the segment number indicate logical numbers (positions) of segments.

The SU number is an identifier of an SU to which a segment belongs. The LUN number is an identifier of a LUN to which a segment is assigned. The SU number and the LUN number indicate physical numbers (positions) of segments. The segment state is a state indicative of whether a segment is accessible.

For example, the segment information 1500-1 indicates the SU number "1", the LUN number "1", and the segment state "valid" of a segment 1 of a segment set 1 of a VDISK 1. The SU number "1" corresponds to the SU #1, and the LUN number "1" corresponds to the LUN #1. The segment table 1500 sequentially stores segment information of a pair of mirrored segments. For example, the segment information 1500-2 is segment information of the LUN at the mirror destination of the LUN #1 indicated by the segment information 1500-1.

A specific example of process details of the error process of the I/O process for the segment of the LUN #j will be described with reference to FIG. 16. In this description, by way of example, notification of error information of an I/O process for a segment of the LUN #7 in the SU #1 is made.

Figure 16:
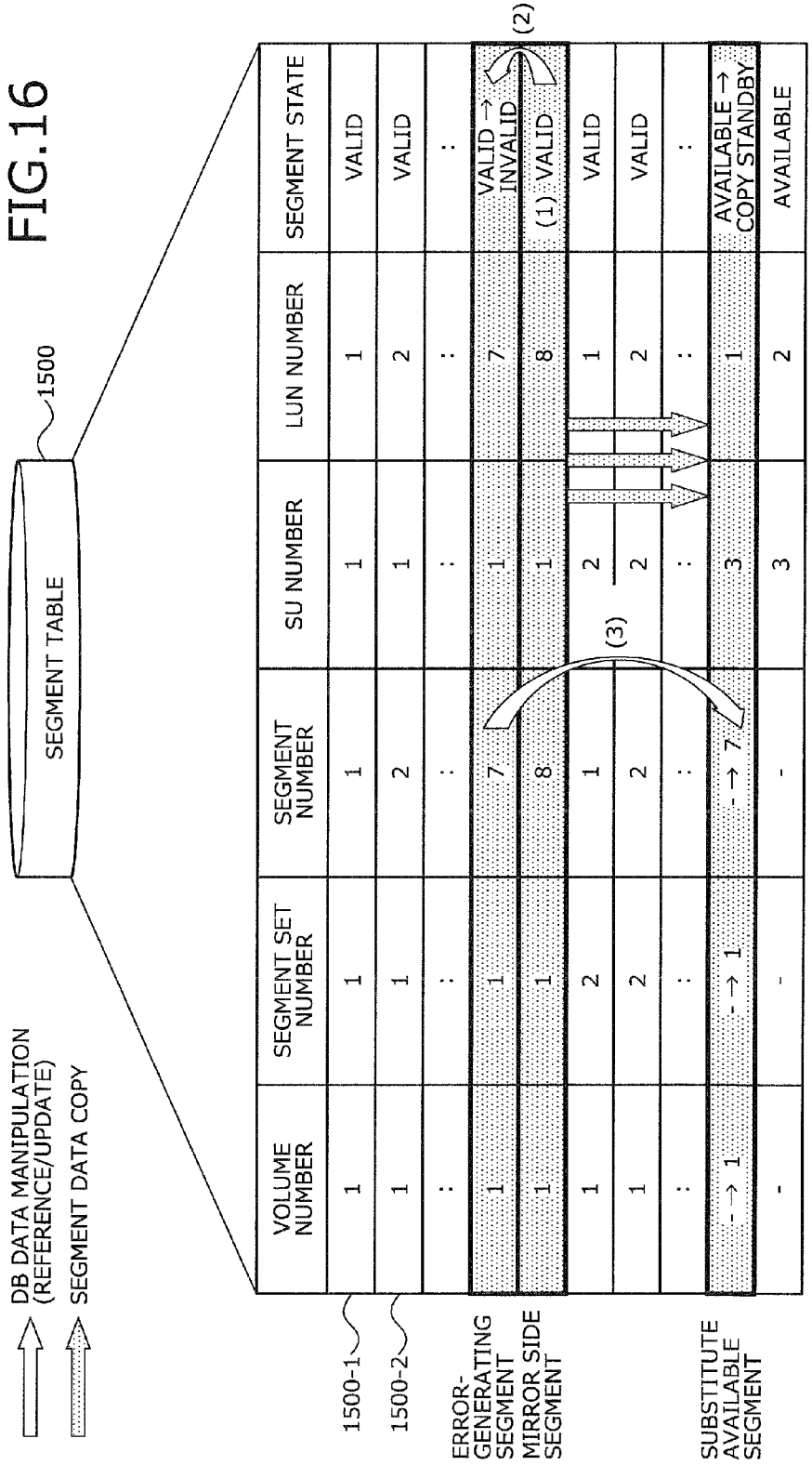
FIG. 16 is an explanatory view of an update example of a segment table 1500.
Figure 18:
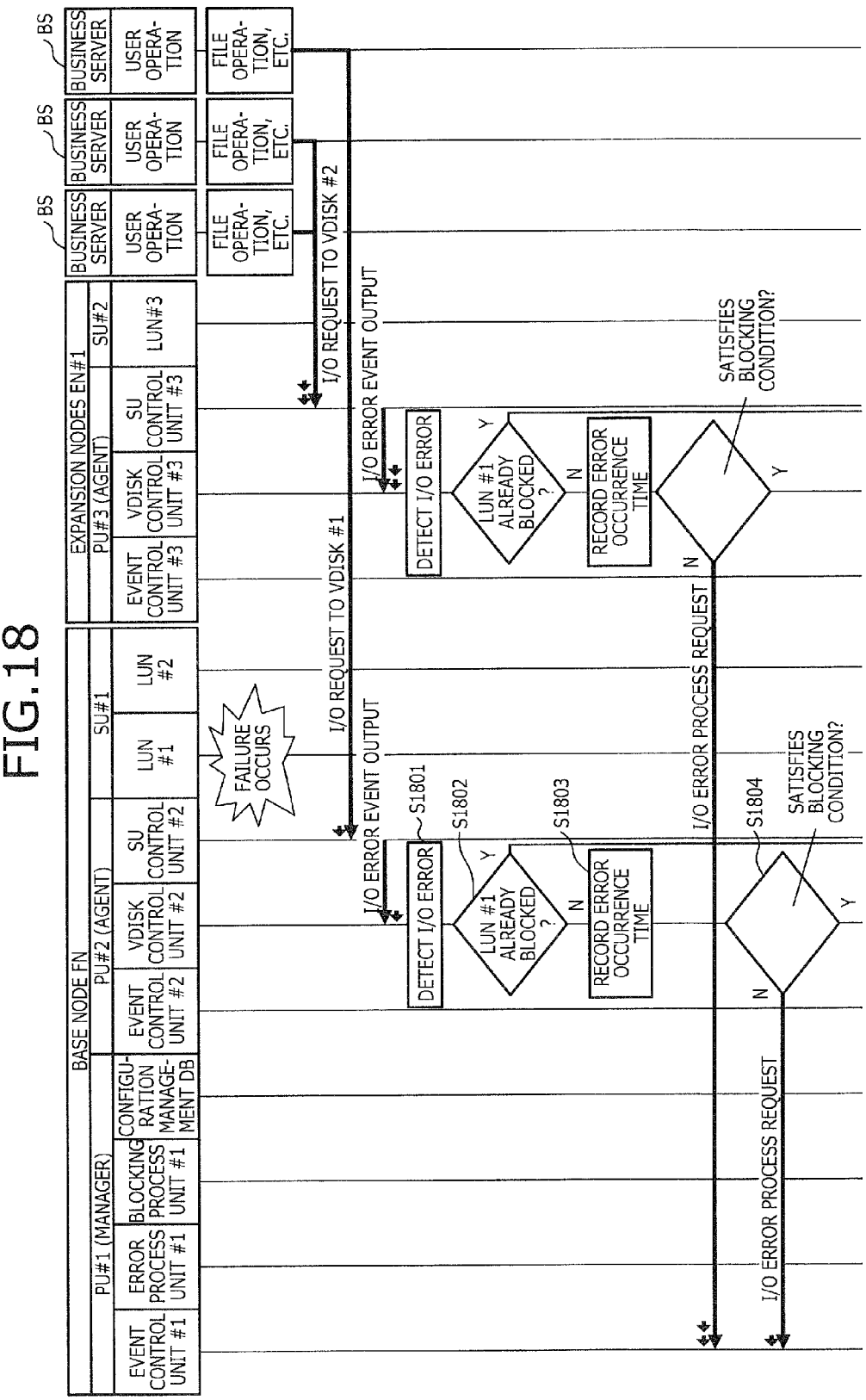
FIGS. 18, 19, 20, and 21 are sequence diagrams of an example of a control process procedure of the storage system SM according to the embodiment.

FIG. 16 is an explanatory view of an update example of the segment table 1500. In an update process of the segment table 1500 in the error process, the error process unit #1 refers to segment information of the segment table 1500 to check whether a certain condition is satisfied before executing an update process as needed. These referring/checking/updating processes are executed each time notification of error information is made by an agent.

(1) The error process unit #1 checks that a segment state of a segment #8 (LUN #8) at the mirror destination of the segment #7 assigned to the LUN #7 is "valid" (see (1) of FIG. 16). (2) If the segment state of the segment #8 is "valid", the error process unit #1 changes the segment state of the segment #7 to "invalid" (see (2) of FIG. 16).

(3) The error process unit #1 assigns a segment in the segment state of "available" in the segment table 1500 as the substitute for the error segment (segment #7) and changes the segment state to "copy standby" (see (3) of FIG. 16). To the segment in the segment state of "copy standby", data is asynchronously copied from the segment (segment #8) at the mirror destination and, when the copying is completed, the segment state is switched to "valid" and the mirror configuration is restored.

(4) If the segment state of the segment #7 is changed to "invalid", the error process unit #1 notifies all the agents (the PUs #2 and #3) of the segment state "invalid" of the segment #7. When an agent is notified of the segment state "invalid" of the segment #7, the agent changes the segment state for the driver managed by the agent to indicate that the error segment is invalid. After changing the segment state, the agent refrains from performing I/O from a user (e.g., the business server BS) for the segment (causes the I/O to be performed on the mirror side).

After the above process is completed, the error process unit #1 notifies the error-generating agent of a resumption process request for the I/O process. In the following description, the process of (1) to (4) may be referred to as a "configuration management DB update", and a process executed by the agent as an extension of the process of (4) may be referred to as a "driver state change".

Blocking conditions of the LUN #j in the agents (e.g., the PUs #2 and #3) and the manager (e.g., the PU #1) will be described with reference to FIG. 17.

FIG. 17 is an explanatory view of an error occurrence frequency of an I/O process. When the number of users (e.g., business servers BS) increases, the scale-out type storage system SM can expand the capability/capacity through node expansion to support the increase. In this case, not only the number of VDISKs, i.e., error occurrence sources at the time of SU failure, increase, but also the number of agents making up an error notification channel increases and therefore, the error occurrence frequencies are respectively changed in the agent/the manager.

It is assumed that the number of VDISKs having an error of the I/O process is "n" and that the number of agents having an error of the I/O process is "m" in the storage system SM. In this case, the error occurrence frequency in the agent can be expressed as "n/m(=α)" and the error occurrence frequency in the manager can be expressed as "n(=β)".

For example, if the number of VDISKs having an error of the I/O process is changed from "n" to "N(>n)", the error occurrence frequency in the agent is increased to "N/m (=γ>α)". The error occurrence frequency in the manager is increased to "N(>β)".

For example, if the number of agents having an error of the I/O process is changed from "m" to "M(>m)", the error occurrence frequency in the agent is decreased to "n/m (=δ<α)". On the other hand, the error occurrence frequency in the manager remains at "n(=β)".

For example, if the number of VDISKs having an error of the I/O process is changed from "n" to "N(>n)" and the number of agents having an error of the I/O process is changed from "m" to "M(>m)", the error occurrence frequency in the agent is "N/M(<γ, >δ)". The error occurrence frequency in the manager is "N(>β)".

Consequently, the node expansion and the error occurrence frequencies of the agent/manager are in the following (Relationship 1) and (Relationship 2).

(Relationship 1) If the number of error-generating VDISKs increases, the error occurrence frequencies of the agent/manager increase.

(Relationship 2) If the number of error-generating agents increases, the error occurrence frequency of the agent decreases.

Therefore, when the number of error-generating VDISKs is "$V_{err}$" and the number of error-generating agents is "$A_{err}$", the error occurrence frequency "$e_{agt}$" of the agent can be expressed by using Equation (3) using the average number of times of I/O of VDISKs per unit time (iops).

$$e_{agt}=(V_{err}/A_{err}) \cdot \text{iops [errors/sec]} \quad (3)$$

A ratio between $V_{err}$ and $A_{err}$ is considered to be approximate to a ratio between the number $V_{all}$ of the VDISKs and the number $A_{all}$ of the agents of the whole. It is assumed that iops can be measured by the ability of storages. Therefore, a blocking condition $E_{agt}$ of the LUN #j in the agent can be expressed as Equation (4). The predetermined value Xa of Equation (1) described above corresponds to "$E_{agt}$" of Equation (4).

$$E_{agt}=(V_{all}/A_{all}) \cdot \text{iops [errors/sec]} \quad (4)$$

When the error processing time in the manager is "$P_{mgr}$" and the I/O timeout time is "$T_{timeout}$", an error occurrence frequency $e_{mgr}$ and a blocking time $t_{mgr}$ of the manger are required to satisfy Equation (5). The I/O timeout time $T_{timeout}$ is a value arbitrarily set by the business server BS. The blocking time $t_{mgr}$ is a time from the first time when a SU notifies the agent of an error of the LUN #j until the LUN #j enters the blocking state due to the judgment of the manager.

$$(e_{mgr}P_{mgr}-1) \cdot t_{mgr} < T_{timeout} \quad (5)$$

In Equation (5), the error occurrence frequency $e_{mgr}$ and the blocking time $t_{mgr}$ are values varying depending on setting of the blocking condition. The error processing time $P_{mgr}$ can ideally be considered as a constant value according to performance of a system. Therefore, a blocking condition $E_{mgr}$ of the LUN #j in the manager can be expressed as Equation (6) from the left side of Equation (5) on the assumption that a measured value is used for the error processing time $P_{mgr}$. The predetermined value Xm of Equation (2) described above corresponds to "$E_{mgr}$" of Equation (6).

$$E_{mgr}=(1/P_{mgr}) \text{ [errors/sec]} \quad (6)$$

A control process procedure of the storage system SM according to the example will be described. In the following description, by way of example, a failure occurs in the LUN #1 in the SU #1 making up the VDISKs #1 and #2. The process procedures of the agents (the PU #2, the PU #3) will be described by taking the process procedure of the PU #2 as an example.

FIGS. 18, 19, 20, and 21 are sequence diagrams of an example of the control process procedure of the storage system SM according to the embodiment. In the sequence diagram of FIG. 18, first, the VDISK control unit #2 of the PU #2 detects an I/O error when accepting an I/O error event from the SU control unit #2 (step S1801).

The VDISK control unit #2 refers to the blocking list 500 (see FIG. 5) to determine whether the LUN #1 is already blocked (step S1802). The LUN #j already blocked means that the LUN #j is in the blocking state. If the LUN #1 is already blocked (step S1802: YES), the procedure goes to step S2102 depicted in FIG. 21.

On the other hand, if the LUN #1 is not already blocked (step S1802: NO), the VDISK control unit #2 records the error occurrence time of the LUN #1 in the error time recording queue Q2 (see FIG. 6) (step S1803). The VDISK control unit #2 refers to the error time recording queue Q2 to determine whether the LUN #1 satisfies the blocking condition Eat (step S1804).

If the blocking condition $E_{agt}$ is satisfied (step S1804: YES), the event control unit #1 of the PU #1 is notified of the blocking process request of the LUN #1 and the procedure goes to step S2002 depicted in FIG. 20. On the other hand, if the blocking condition $E_{agt}$ is not satisfied (step S1804: NO), the VDISK control unit #2 notifies the event control unit #1 of the PU #1 of an I/O error process request. The I/O error process request corresponds to the error information described above.

Figure 19:
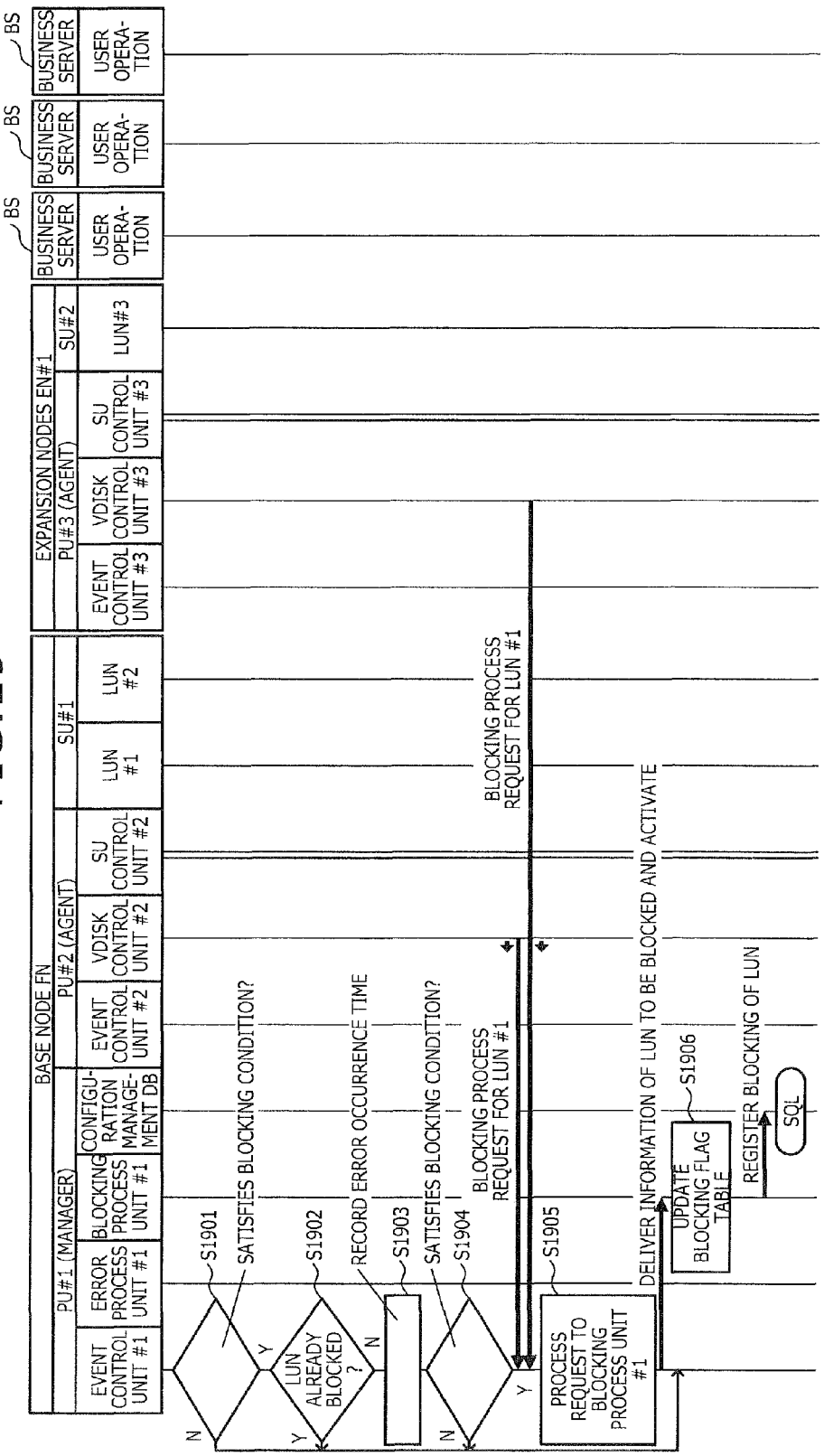

In the sequence diagram of FIG. 19, first, the event control unit #1 of the PU #1 determines whether the I/O error process request is accepted (step S1901). If the I/O error process request is not accepted (step S1901: NO), the procedure goes to step S2001 depicted in FIG. 20.

On the other hand, if the I/O error process request is accepted (step S1901: YES), the event control unit #1 refers to the blocking flag table 400 (see FIG. 4) to determine whether the LUN #1 is already blocked (step S1902). If the LUN #1 is already blocked (step S1902: YES), the procedure goes to step S2001 depicted in FIG. 20.

On the other hand, if the LUN #1 is not already blocked (step S1902: NO), the event control unit #1 records the error occurrence time of the LUN #1 in the error time recording queue Q1 (see FIG. 6) (step S1903). The event control unit #1 refers to the error time recording queue Q1 to determine whether the LUN #1 satisfies the blocking condition $E_{mgr}$ (step S1904).

If the blocking condition $E_{mgr}$ is not satisfied (step S1904: NO), the procedure goes to step S2001 depicted in FIG. 20. On the other hand, if the blocking condition $E_{mgr}$ is satisfied (step S1904: YES), the event control unit #1 notifies the blocking process unit #1 of a process request (step S1905). For example, the event control unit #1 delivers information of the LUN to be blocked and activates the blocking process unit #1.

The blocking process unit #1 updates the blocking flag table 400 in the configuration management DB 810 (step S1906). For example, the blocking process unit #1 changes the blocking flag of the LUN #1 from "OFF" to "ON".

Figure 20:
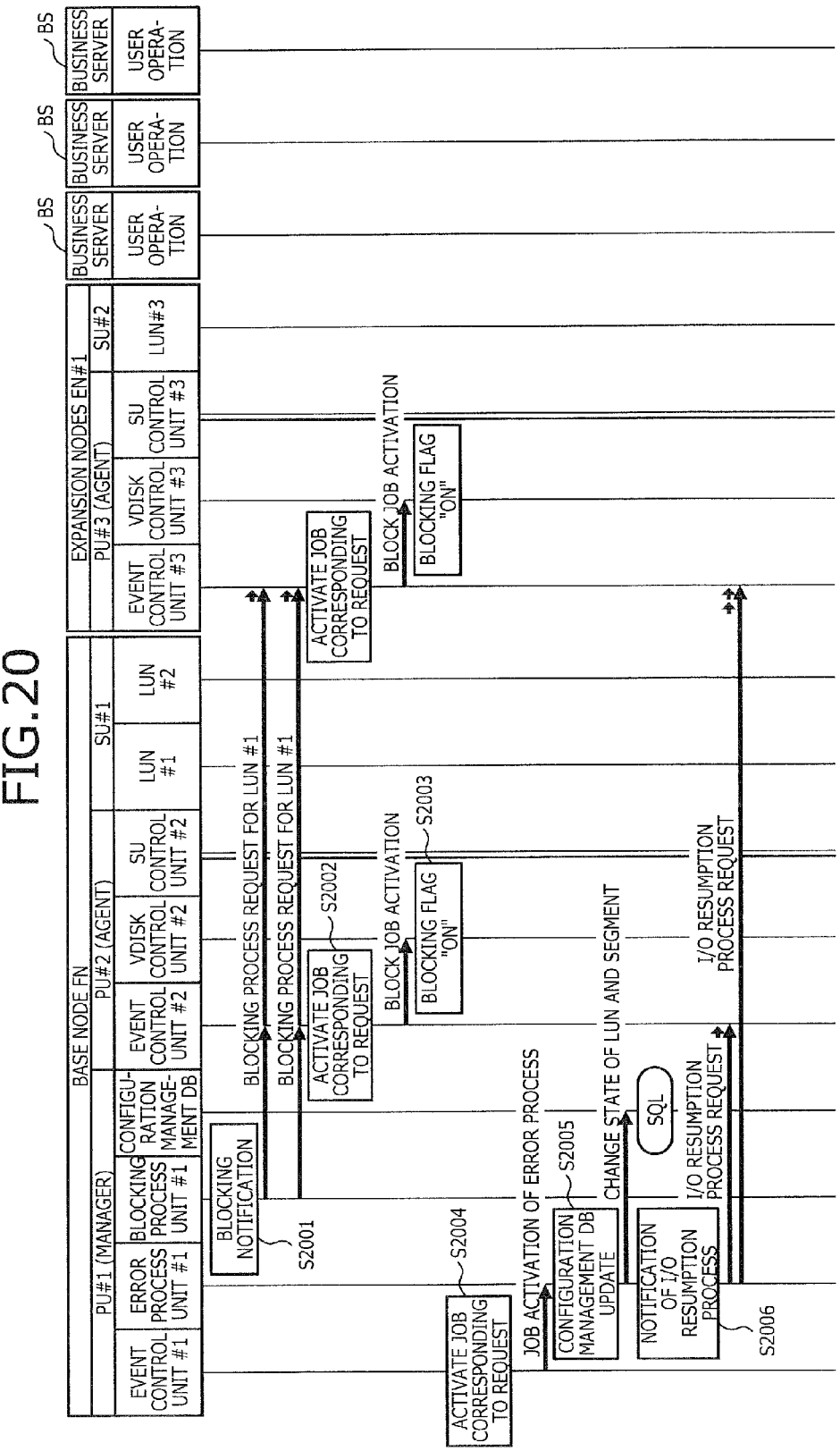

In the sequence diagram of FIG. 20, first, the blocking process unit #1 notifies the event control unit #2 of the PU #2 and the event control unit #3 of the PU #3 of the blocking request for the LUN #1 (step S2001). When accepting the blocking request for the LUN #1, the event control unit #2 of the PU #2 activates a job corresponding to the request (step S2002).

The VDISK control unit #2 of the PU #2 sets the blocking flag of the LUN #1 to "ON" (step S2003). The blocking flag "ON" in this case means that the information identifying the LUN #1 is registered into the blocking list 500, for example.

The event control unit #1 of the PU #1 activates a job corresponding to the request (step S2004). In this case, the job of the error process is activated. The error process unit #1 executes the process of the "configuration management DB update" (step S2005). The error process unit #1 notifies the event control unit #2 of the PU #2 of an I/O resumption process request (step S2006).

Figure 21:
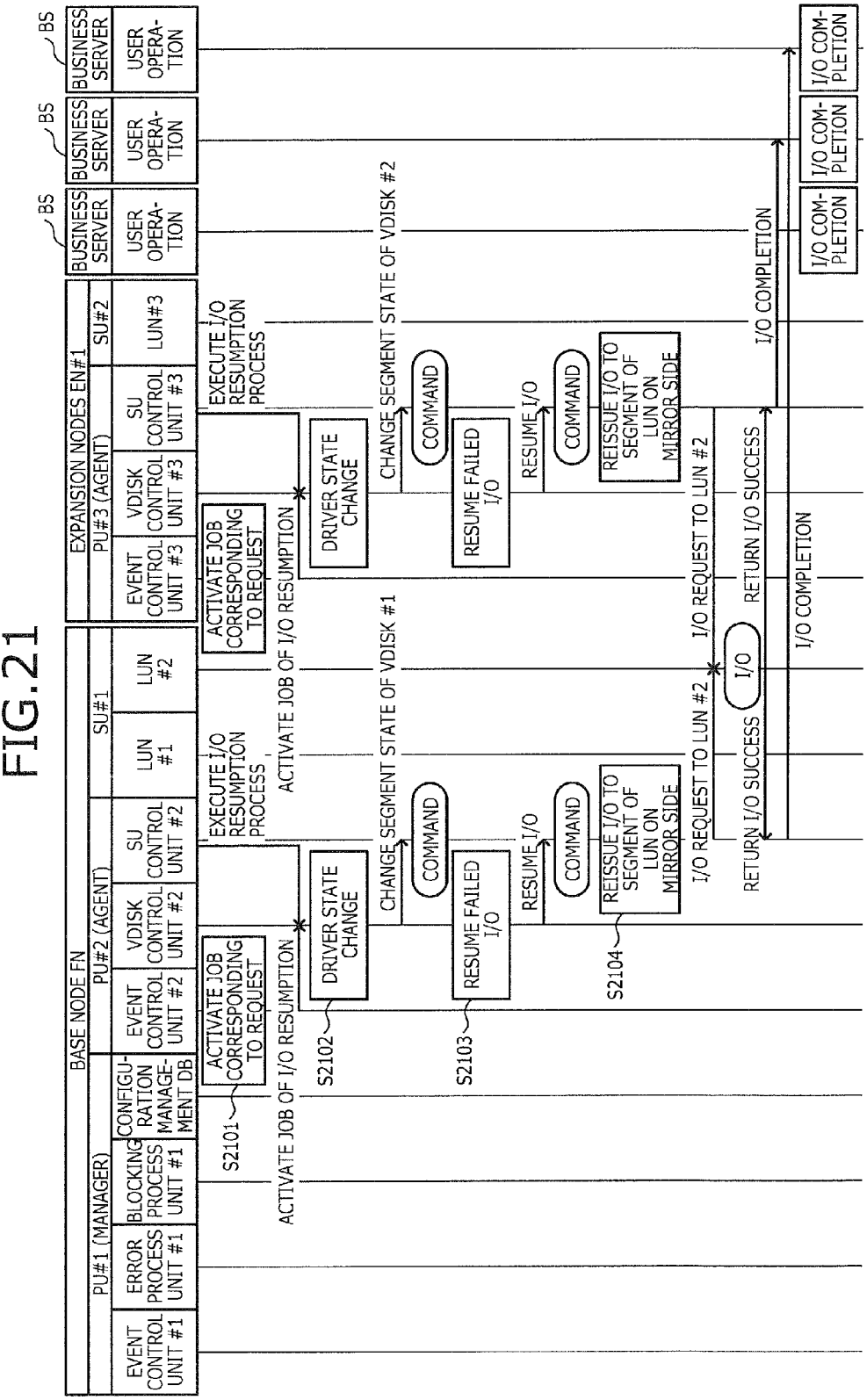

In the sequence diagram of FIG. 21, first, the event control unit #2 of the PU #2 activates the job corresponding to the request (step S2101). In this case, the job of the I/O resumption is activated. The VDISK control unit #2 of the PU #2 executes the process of the "driver state change" (step S2102).

The VDISK control unit #2 resumes failed I/O (step S2103). The failed I/O is the I/O process for the segment of the LUN #1 in the SU #1 making up the VDISK #1. The SU control unit #2 of the PU #2 reissues the I/O to the segment of the LUN on the mirror side (step S2104).

As a result, the I/O request to the LUN #2 on the mirror side is issued and if the I/O process is successful, the SU control unit #2 notifies the business server BS of completion of I/O and the I/O is completed.

As a result, the occurrence frequency of I/O errors for the segment of the LUN #1 can be monitored in the agents (PUs #2 and #3) and the manager (PU #1). If the occurrence frequency of I/O errors for the LUN #1 satisfies the blocking condition ($E_{agt}$, $E_{mgr}$), the agents can subsequently execute the resumption process of the I/O process without notifying the manager of the I/O error.

A blocking cancelation example of the LUN #j will be described. In the following description, by way of example, the blocking state of the LUN #1 is canceled in the SU #1 making up the VDISKs #1 and #2. It is assumed that the SU #1 is restored by a maintenance staff (e.g., by means of hardware replacement) and that the LUN #1 in the blocking state becomes usable again in the storage system SM.

FIG. 22 is an explanatory view of the blocking cancelation example of the LUN. In FIG. 22, first, the manager (PU #1) regularly requests restoration confirmation of the LUN #1 in the SU #1 to an agent (e.g., the PU #2, #3) in the storage system SM (see (1) of FIG. 22). It is assumed that the restoration confirmation of the LUN #1 in the SU #1 is requested to the agent (PU #2).

When accepting the restoration confirmation of the LUN #1 in the SU #1, the agent (PU #2) issues a test I/O request to the LUN #1 in the SU #1 (see (2) of FIG. 22). If the test I/O request is normally processed, the agent (PU #2) notifies the manager (PU #1) of success of I/O.

If notification of the success of I/O is accepted, the manager (PU #1) cancels the blocking state of the LUN #1 in the SU #1 (see (3) of FIG. 22). The manager (PU #1) notifies the agents (e.g., PUs #2 and #3) in the storage system SM of the blocking cancelation request for the LUN #1 in the SU #1 (see (4) of FIG. 22). As a result, the blocking state of the LUN #1 in the SU #1 is canceled in the agents (e.g., PUs #2 and #3).

Therefore, when the SU #1 is restored by a maintenance staff (e.g., by means of hardware replacement) and the LUN #1 in the blocking state becomes usable again, the blocking state can automatically be cancelled. Even if the LUN #1 is shifted to the blocking state because of a "cause other than hardware failure", such as temporary power interruptions, the blocking state can automatically be cancelled when the power source is restored and becomes accessible.

As described above, the storage system SM according to the example can respectively record the numbers of times of occurrence of I/O errors for the LUN #j in the agents (PUs #2 and #3) and the manager (PU #1) to monitor the I/O error occurrence frequencies. If the I/O error occurrence frequencies become greater than or equal to the predetermined values (Xa and Xm), the resumption process of the I/O process can subsequently be executed without making a notification of an I/O error from the agents to the manager. As a result, the resumption time of the I/O process is shortened and an I/O failure of the business server BS due to timeout can be avoided.

It is assumed that, in an operation environment having 128 PUs connected to 1000 VDISKs, a failure of a given SU causes I/O errors to occur at the same time in all the VDISKs utilizing inside LUNs. It is also assumed that the average iops of the VDISKs is "10" and that the error process in the manager requires "0.001 sec/error". In this case, the blocking condition $E_{agr}$ of the agents is "78 errors/sec" and the blocking condition $E_{mgr}$ of the manager is "1000 errors/sec".

In this case, for example, if the conventional resumption process is executed through the manager, the manager must execute the error process at the rate of "1000 errors/sec". Therefore, 9000 errors remain at the time point of one second from the failure, causing a delay of nine seconds, and the delay time consequently increases.

In contrast, if errors disproportionately occur in a portion of the agents in the storage system SM, the blocking condition $E_{agr}$ of the agents is satisfied. By way of example, assuming that the errors disproportionately occur in 10 agents, the errors occur at the rate of "1000 errors/sec" in each of the agents and when errors are detected 79 times, i.e., at the time point of 0.08 seconds from the failure, the blocking determination is made. At this time point, the manager is notified of, and processes, "10000×0.08−800" errors before the blocking and therefore, the delay is up to 0.8 seconds.

On the other hand, if errors evenly occur in all the 128 agents, the blocking condition $E_{agr}$ of the agents is not satisfied and the blocking condition $E_{mgr}$ of the manager is satisfied. In this case, the manager executes at least 1000 error processes and makes the blocking determination at the time point after 0.1 second from the failure. Although those errors generate a delay of "1000×0.001=1.0 second" after the blocking, the error notification is subsequently stopped and the delay is eliminated.

As described above, by setting the proper blocking conditions ($E_{agt}$, $E_{mgr}$) according to the system configuration in the storage system SM, the delay time from an I/O error until the resumption process is reduced and the I/O failure of the business server BS due to timeout can be avoided.

The control method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage system comprising:
a first control apparatus;
at least one second control apparatus that is managed by the first control apparatus; and
a storage unit that can be accessed by the second control apparatuses, wherein
each of the second control apparatuses includes a second processor that is configured to:
determine based on detection of an error of an input/output process for storage in the storage unit whether the storage is in a blocking state, the blocking state being a state in which the first control apparatus is not notified of the error information of the storage when an error occurs in an input/output process for the storage,
execute a resumption process of the input/output process based on a determination of the storage being in the blocking state,
judge whether an error occurrence frequency of the input/output process for the storage is at least a predetermined value, based on a determination of the storage not being in the blocking state, and
transmit to the first control apparatus, a blocking process request for the storage, based on a judgment that the error occurrence frequency is at least the predetermined value, the blocking process being a process of changing the state of the storage in the first control apparatus to the blocking state and transmitting a blocking request to the second control apparatuses in the storage system, and
the first control apparatus includes a first processor that is configured to:
execute a blocking process of the storage, based on reception of the blocking process request, and
execute an error process of the storage, based on reception of the blocking process request.

2. The storage system according to claim 1, wherein
the second processor transmits to the first control apparatus upon judging that the error occurrence frequency is less than the predetermined value, error information that indicates occurrence of an error of the input/output process for the storage,
the first processor is further configured to:
judge whether an error occurrence frequency of the input/output process for the storage is at least a second predetermined value, based on reception of the error information, and
transmit a blocking request for the storage to the second control apparatuses, based on a judgment that the error occurrence frequency is at least the second predetermined value, and
The first processor executes the error process of the storage upon reception of the error information.

3. The storage system according to claim 2, wherein
the first processor is further configured to determine whether the storage is in the blocking state, based on the reception of the error information, and
the first processor judges whether an error occurrence frequency of the input/output process for the storage is at least a predetermined value, based on a determination that the storage is not in the blocking state by the first processor.

4. The storage system according to claim 1, wherein
the first processor transmits a resumption process request of the input/output process to the second control apparatus, when the error process of the storage is completed, and
the second processor executes the resumption process of the input/output process, when the resumption process request is received.

5. The storage system according to claim 1, wherein
the second processor is further configured to calculate the predetermined value based on a total number of volumes created on the second control apparatuses, a total number of the second control apparatuses, and the number of input/output requests for the volumes issued per unit time in the second control apparatus, and the second processor judges whether the error occurrence frequency of the input/output process for the storage is at least the predetermined value calculated by the second processor.

6. The storage system according to claim 1, wherein each storage in the storage unit has a mirror destination storage, and
the second processor is configured to accesses, when the storage is in the blocking state, a storage at a mirror destination of the storage to resume the input/output process without making error notification to the first control apparatus.

7. A control apparatus comprising
a processor that is configured to:
   determine based on detection of an error of an input/output process for storage in the storage unit whether the storage is in a blocking state, the blocking state being a state in which the first control apparatus is not notified of the error information of the storage when an error occurs in an input/output process for the storage,
   execute a resumption process of the input/output process based on a determination of the storage being in the blocking state,
   judge whether an error occurrence frequency of the input/output process for the storage is at least a predetermined value, based on a determination of the storage not being in the blocking state, and
   transmit based on judgment that the error occurrence frequency is at least the predetermined value, a blocking process request for the storage to a first control apparatus controlling a plurality of control apparatuses including the control apparatus, the blocking process being a process of changing the state of the storage in the first control apparatus to the blocking state and transmitting a blocking request to the second control apparatuses in the storage system, wherein
the first control apparatus executes a blocking process of the storage and executes an error process of the storage when the blocking process request is received.

8. The control apparatus according to claim 7, wherein each storage in the storage unit has a mirror destination storage, and
the processor is further configured to accesses, when the storage is in the blocking state, a storage at a mirror destination of the storage to resume the input/output process without making error notification to the first control apparatus.

9. A non-transitory, computer-readable recording medium storing a control program that causes a control apparatus, which controls an accessible storage unit, to execute a process comprising:
   determining based on detection of an error of an input/output process for storage in the storage unit whether the storage is in a blocking state, the blocking state being a state in which the first control apparatus is not notified of the error information of the storage when an error occurs in an input/output process for the storage,
   executing a resumption process of the input/output process based on a determination of the storage being in the blocking state,
   judging whether an error occurrence frequency of the input/output process for the storage is at least a predetermined value, based on a determination of the storage not being in the blocking state, and
   transmitting when judgment that the error occurrence frequency is at least the predetermined value, a blocking process request for the storage to a first control apparatus controlling a plurality of control apparatuses including the control apparatus, the blocking process being a process of changing the state of the storage in the first control apparatus to the blocking state and transmitting a blocking request to the second control apparatuses in the storage system, wherein
the first control apparatus executes a blocking process of the storage and executes an error process of the storage when the blocking process request is received.

10. The non-transitory, computer-readable recording medium according to claim 9, wherein
each storage in the storage unit has a mirror destination storage, and
the process further comprising:
   accessing, when the storage is in the blocking state, a storage at a mirror destination of the storage to resume the input/output process without making error notification to the first control apparatus.

* * * * *